United States Patent [19]

Williames

[11] Patent Number: 5,644,999

[45] Date of Patent: Jul. 8, 1997

[54] APPARATUS AND METHOD FOR TRANSFERRING SEEDLINGS FROM PLANT TRAYS

[75] Inventor: Geoffrey Allan Williames, Warragul, Australia

[73] Assignee: Speedling, Inc., Sun City, Fla.

[21] Appl. No.: 537,918

[22] PCT Filed: Aug. 2, 1994

[86] PCT No.: PCT/US94/08783

§ 371 Date: Nov. 1, 1995

§ 102(e) Date: Nov. 1, 1995

[87] PCT Pub. No.: WO95/04451

PCT Pub. Date: Feb. 16, 1995

[30] Foreign Application Priority Data

Aug. 4, 1993 [AU] Australia ................... PM 0348

[51] Int. Cl.⁶ ........................................... A01C 11/00
[52] U.S. Cl. ..................... 111/105; 221/79; 221/88; 414/417
[58] Field of Search .................... 111/100, 104, 111/105, 919; 47/14, 1.01, 73, 75, 77, 83, 86; 209/668; 198/692, 693; 221/79, 81, 88; 414/403, 404, 416, 417; 406/76

[56] References Cited

U.S. PATENT DOCUMENTS

| | | | |
|---|---|---|---|
| 4,388,035 | 6/1983 | Cayton et al. | 111/105 X |
| 4,443,151 | 4/1984 | Armstrong et al. | 111/105 X |
| 4,893,571 | 1/1990 | Häkli et al. | 111/105 |

FOREIGN PATENT DOCUMENTS

| | | |
|---|---|---|
| 0243264 | 10/1987 | European Pat. Off. . |
| 3942599 | 6/1991 | Germany . |
| 9403040 | 2/1994 | WIPO . |

*Primary Examiner*—Terry Lee Melius
*Assistant Examiner*—Christopher J. Novosad
*Attorney, Agent, or Firm*—Reid & Priest

[57] ABSTRACT

A transplanter for transferring seedlings from plant trays to a planting position includes a special plant tray having a series of longitudinal indexing grooves and a transverse alignment groove for engagement with indexing rods and support rings that are joined together to form an indexing drum. The indexing drum is mounted adjacent a loading frame for guiding the plant trays into position for ejection of the plant seedlings and includes an integrally internally mounted plug ejector subassembly which moves relative to the indexing drum at each of a number of successive indexing positions of the drum for ejection of seedlings from the plant tray. The indexing grooves and transverse alignment groove on the plant tray provide datum surfaces for ensuring accurate positioning of the plug ejector subassembly relative to the seedlings in the plant tray.

16 Claims, 21 Drawing Sheets

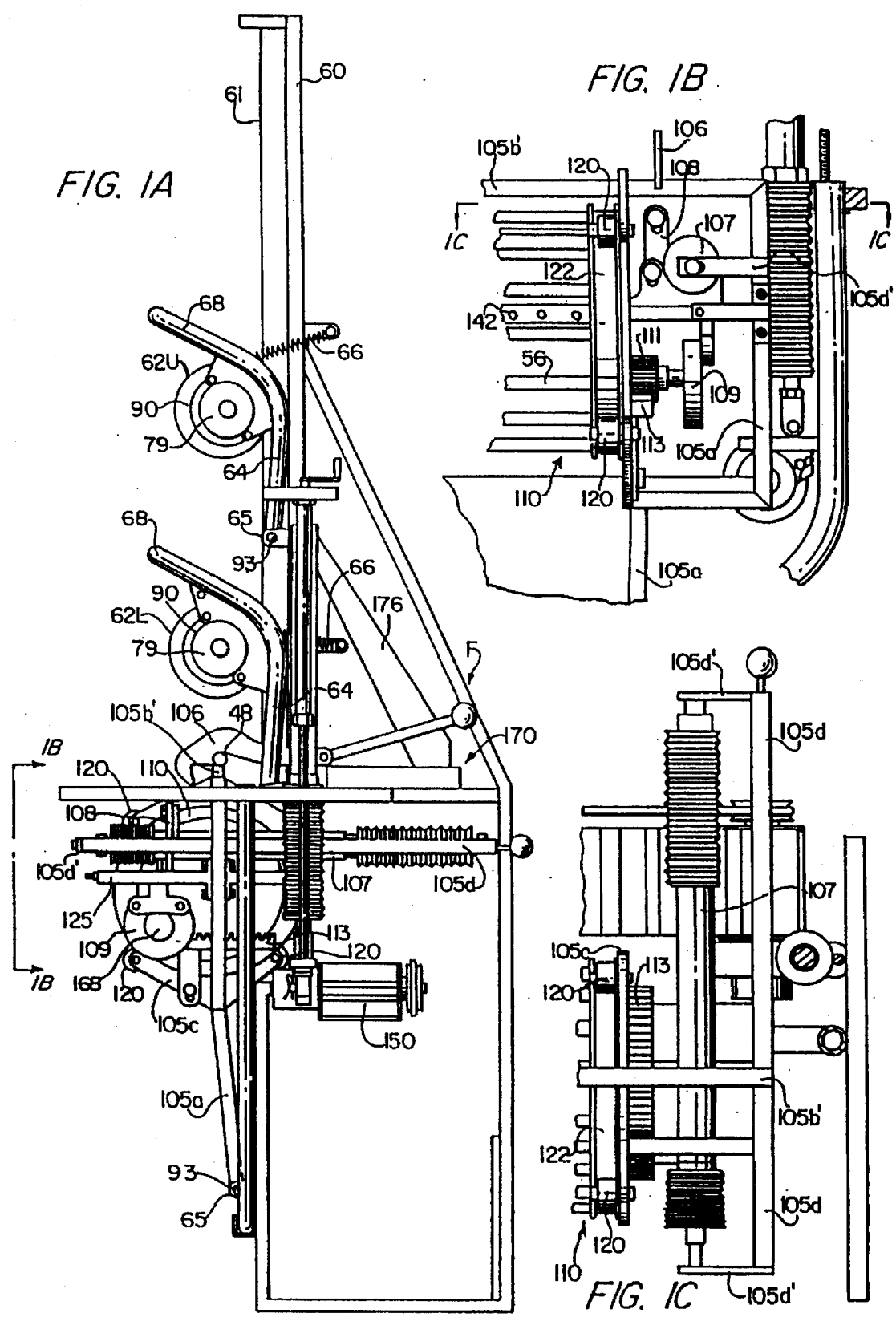

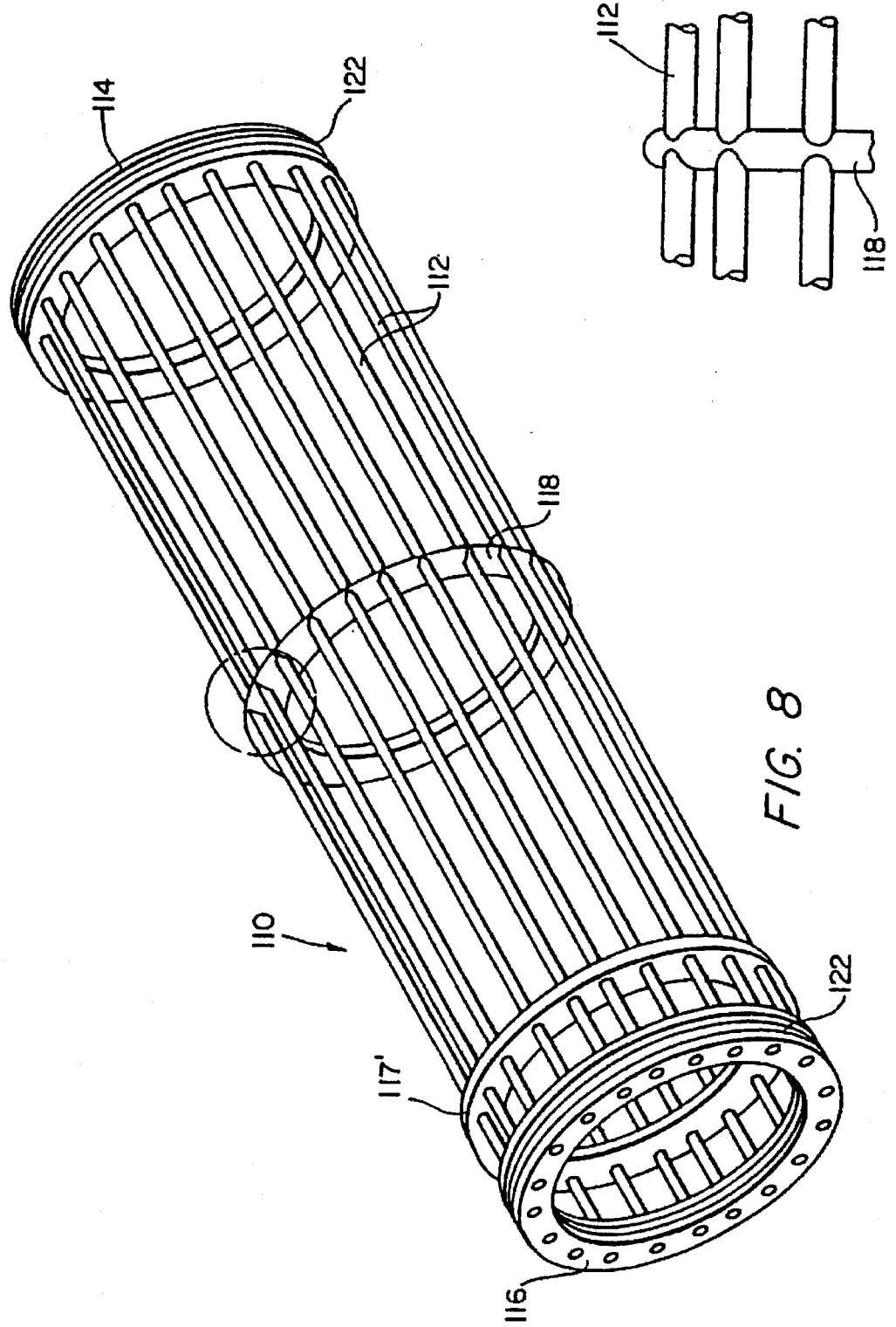

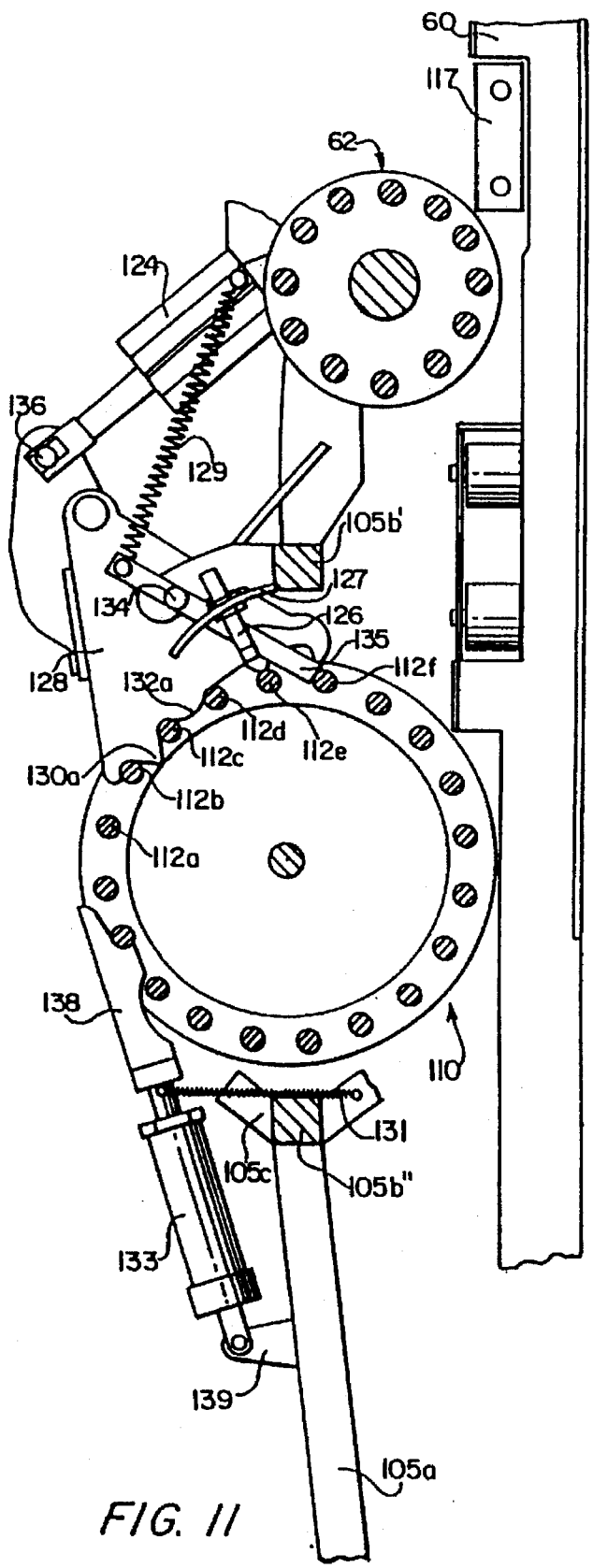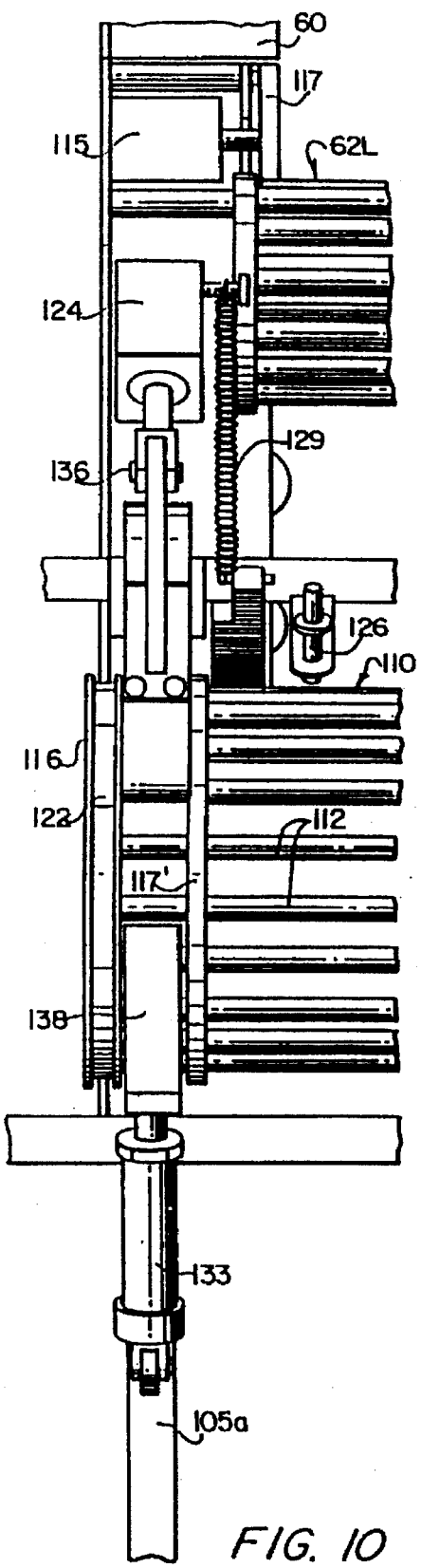
FIG. 11
FIG. 10

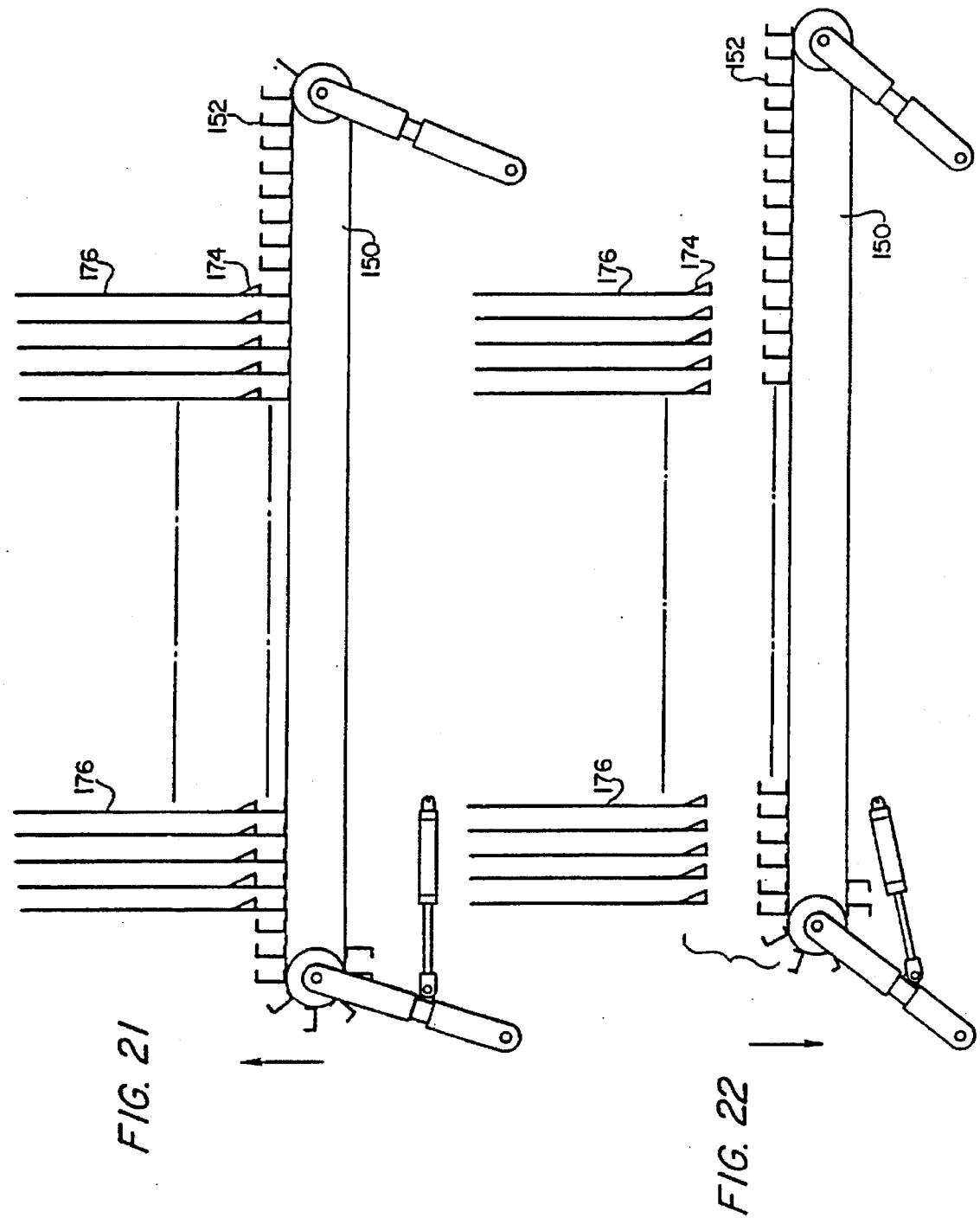

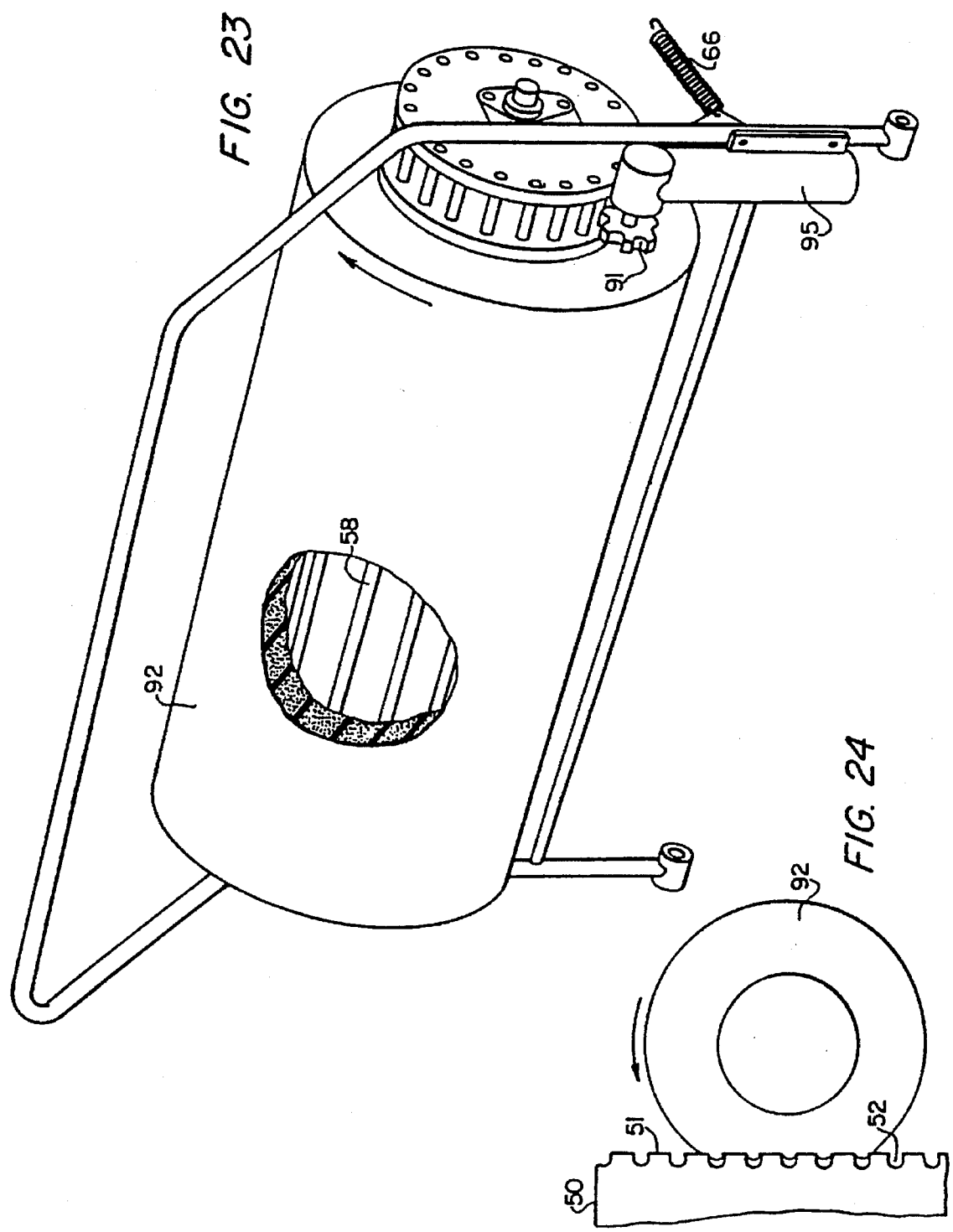

APPARATUS AND METHOD FOR TRANSFERRING SEEDLINGS FROM PLANT TRAYS

BACKGROUND OF THE INVENTION

1. Field of the Invention

The present invention relates to an automatic transplanter. More specifically, the invention relates to a mechanism for transferring seedlings or plants from plant trays or flats ("trays" and "flats" are used interchangeably in the art and in the application) in which they have been grown or propagated onto a conveyor for delivering to means for effecting transplanting into a field.

2. Related Art

Related prior art transplanters have included indexing mechanisms that engage on the ends and sides of trays containing seedlings or which engage a single contact point on the back of such trays. Therefore, these previous transplanters require a mechanism for ejecting the seedlings from the trays that is separate from the indexing mechanism. An inherent disadvantage of these previous transplanters is the frequency of misalignment between the seedling ejection apparatus and the rows of seedlings in a particular tray. This misalignment results from variations in the center-to-center distance between rows of seedlings in a tray and the center-to-center distance between the last row of seedlings on one tray and the first row of seedlings on a second succeeding tray being fed into position for ejection of the seedlings. Previous transplanters have relied on gravity for the feeding of a second tray into contact with the indexing mechanism after a first tray has been completely emptied. Consequently, soil or foliage trapped between the two trays often causes significant misalignment of the seedling ejection mechanism with the rows of seedlings in the tray; such misalignment can result in a multitude of malfunctions, none of which are beneficial.

Previous transplanters have employed feed mechanisms which require the use of hard plastic trays rather than trays made from materials such as expanded polystyrene which is of insufficient strength to withstand the forces exerted by such feed mechanisms because of the relatively soft nature of the expanded polystyrene. However, expanded polystyrene trays are desirable to use because of their light weight and lower cost.

SUMMARY OF THE INVENTION

The transplanter of the present invention is adapted to be mounted on a supporting vehicle such as a tractor capable of movement along a row and having planting means which receives seedling plants from the present invention and inserts them in the soil in conventional manner. Disadvantages of earlier transplanters are overcome by providing an indexing mechanism and a seedling or plug ejection mechanism which are positively located relative to each other and relative to a common datum surface on the plant tray. An expanded polystyrene plant tray of the type used with the present invention is of rectangular configuration having a longer longitudinal dimension and a shorter transverse dimension. Each plant tray includes a plurality of plant or seedling cells for containing plugs of growing medium arranged in a matrix of spaced perpendicular longitudinal and transverse rows of the seedling cells. The seedling cells each have a centrally located drain hole on the bottom surface of the plant tray. These plant trays have drive grooves located between adjacent longitudinal rows of cells across a substantial part of the bottom surface of the tray (which is oriented in a vertical plane when in the apparatus of the present invention).

The indexing mechanism of the transplanter according to the present invention includes a rotary indexing drum adapted to engage with the drive grooves of the tray and actuation means arranged to index the indexing drum and hence move the plant tray in sequential steps along a predetermined vertical path perpendicular to the longitudinal rows of seedling cells. An entire longitudinal row of plants is ejected from the tray during each dwell of the indexing drum. In the preferred embodiment the drive grooves comprise parallel indexing grooves in the bottom surface of the plant tray located on either side of the longitudinal rows of cells so that a drive groove is provided between each longitudinal row of cells. The drive grooves extend upwardly from the bottom surface of the plant tray, opposite from the top side of the plant tray from which the seedlings extend.

The rotary indexing drum comprises a driven hollow cylindrical roll having a plurality of parallel longitudinally extending cylindrical rods which define its outer extent and each of which is parallel to the axis of rotation of the hollow cylindrical roll so as to be drivingly engageable with the drive grooves of the tray. This configuration maximizes the contact area between the drive means and the grooves and spreads the resulting mechanical forces created by the indexing roll over a large area of plant tray surface. Therefore, the pressure load that must be withstood by the plant tray during indexing is spread over a large area and reduced so that materials such as expanded polystyrene can be used without damage to the tray surface.

Thus, the preferred embodiment of the indexing drum includes a plurality of indexing rods arranged in spaced, parallel relationship around the circumference of a circle to form a cylindrical indexing drum having an interior cavity and a central axis along which the drum rotates. The indexing drum is rotatably supported by rollers mounted on a drum support frame and located at each end of the drum to engage the outer periphery of the drum to maintain proper radial and linear positioning of the drum at all times. The drum support frame also allows for quick and efficient replacement of an indexing drum in order to accommodate plant trays of different dimensions. The support frame also supports a plug ejection mechanism which comprises a linear row of plug ejecting pins mounted on a pin mounting beam that is parallel to the axis of the indexing drum and which is positioned within the interior cavity of the indexing drum. The plug ejecting pins can be moved into contact with the lower ends of the soil plugs of a longitudinal row of seedlings located in between two adjacent indexing grooves of a tray so as to eject the seedlings outwardly from the tray for deposit onto a conveyer which carries the seedlings to conventional planting means which plants them in a row as the supporting vehicle moves along the row.

The plant tray of the present invention also includes a centrally located transverse alignment groove in the bottom surface of the plant tray which is perpendicular to the indexing grooves and is configured to mate with the outer circumference of a circular mid ring on the indexing drum. This alignment groove provides a datum surface in addition to the datum surfaces provided by the indexing grooves for maintaining the plant tray in proper position relative to the axis of the indexing drum and the plug ejection mechanism.

In the preferred embodiment, the plant trays are oriented in a vertical plane and the indexing mechanism is adapted to index the plant trays downwardly in a vertically configured tray support assembly or loading frame so that plants or seedlings are ejected horizontally from the cells of the plant trays. The above mentioned datum surfaces provided by the transverse alignment groove and the longitudinal indexing grooves on the bottom of the plant tray ensure accurate alignment between plug ejector pins and the drain holes located in the bottom center of each cell. The plug ejection mechanism is mounted to the indexing drum support frame and includes a pin mounting beam positioned parallel to the center axis of the indexing drum. The plug ejecting pins are supported by the pin mounting beam for a consistent axial entry into the bottom of each plant cell of the plant tray and for consequent accurate positioning in alignment with the center line of each row of plugs to be ejected from the plant tray.

The entire mechanism consisting of the hollow indexing drum, the plug ejection mechanism and a power source for rotating the indexing drum and activating the plug ejection mechanism is arranged to be a unit, and is attached as a unit to the plant tray loading frame by a pivotally mounted indexing drum frame and a retention device which allows for quick assembly and disassembly. Different plant tray sizes or plant trays with a different number of plant cells can be easily accommodated by changing the indexing drum and/or the plug ejection mechanism.

A greater biassing force is required than gravity alone to accurately and consistently move plant trays down from their initial loading position in the loading frame to be ready for positive engagement and location on the indexing drum. This force is provided by one or more down loader drums similar in construction to the indexing drum and located on separate pivotal support frames vertically above the indexing drum.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1A is a left side elevation view of the preferred embodiment;

FIG. 1B is a partial rear elevation view taken in the direction of arrows B—B in FIG. 1A.

FIG. 1C is a view taken in the direction of arrows C—C in FIG. 1B.

FIG. 8 is a perspective view of a further embodiment of the indexing drum.

FIG. 9 is an enlarged front elevation view of a portion of the mid ring and indexing rods of the indexing drum of FIG. 8.

FIG. 10 is a front elevation view of a portion of the transplanter including the indexing drum of FIG. 10 along with means for indexing the drum and means for locking the indexing drum in successive index positions.

FIG. 11 is a side elevation view of the components shown in FIG. 10 with a pawl member engaged with the indexing drum in a first position prior to the initiation of an indexing movement of the indexing drum.

FIG. 21 is a front elevation view of a second embodiment of the conveyer belt;

FIG. 22 is a front elevation view similar to FIG. 21 with the second embodiment of the conveyer belt in a lowered position.

FIG. 23 is a perspective view of a second embodiment of a down loader drum mounted on a pivotal support frame.

FIG. 24 is a side elevation view of the second embodiment down loader drum of FIG. 23 engaging with the indexing grooves on the lower surface of a plant tray.

DETAILED DESCRIPTION OF THE PREFERRED EMBODIMENTS

Figure 2:
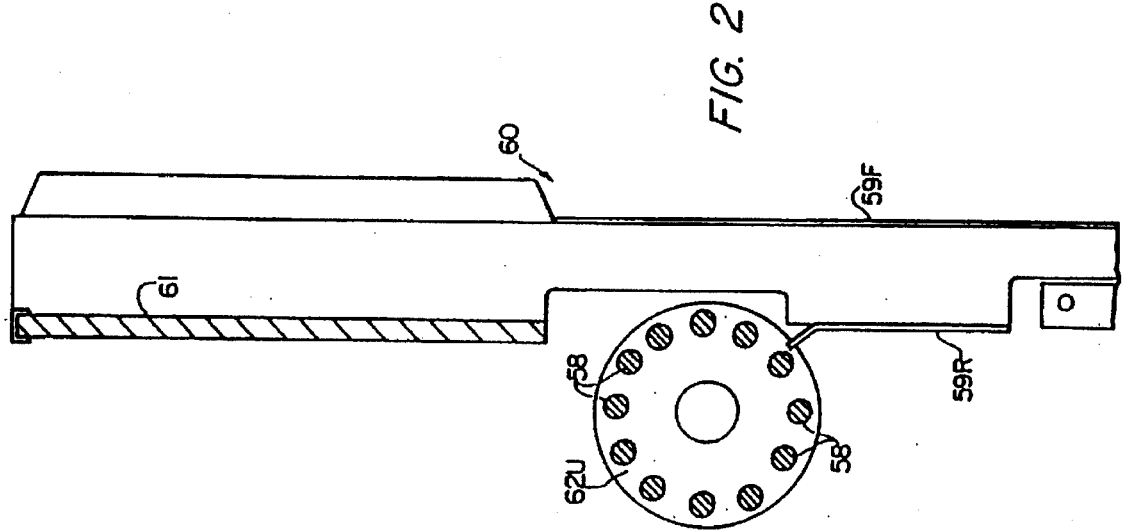
FIG. 2 is a vertical sectional view illustrating the relationship of the upper down loader drum to the vertical guide means for the plant flats.
Figure 2A:
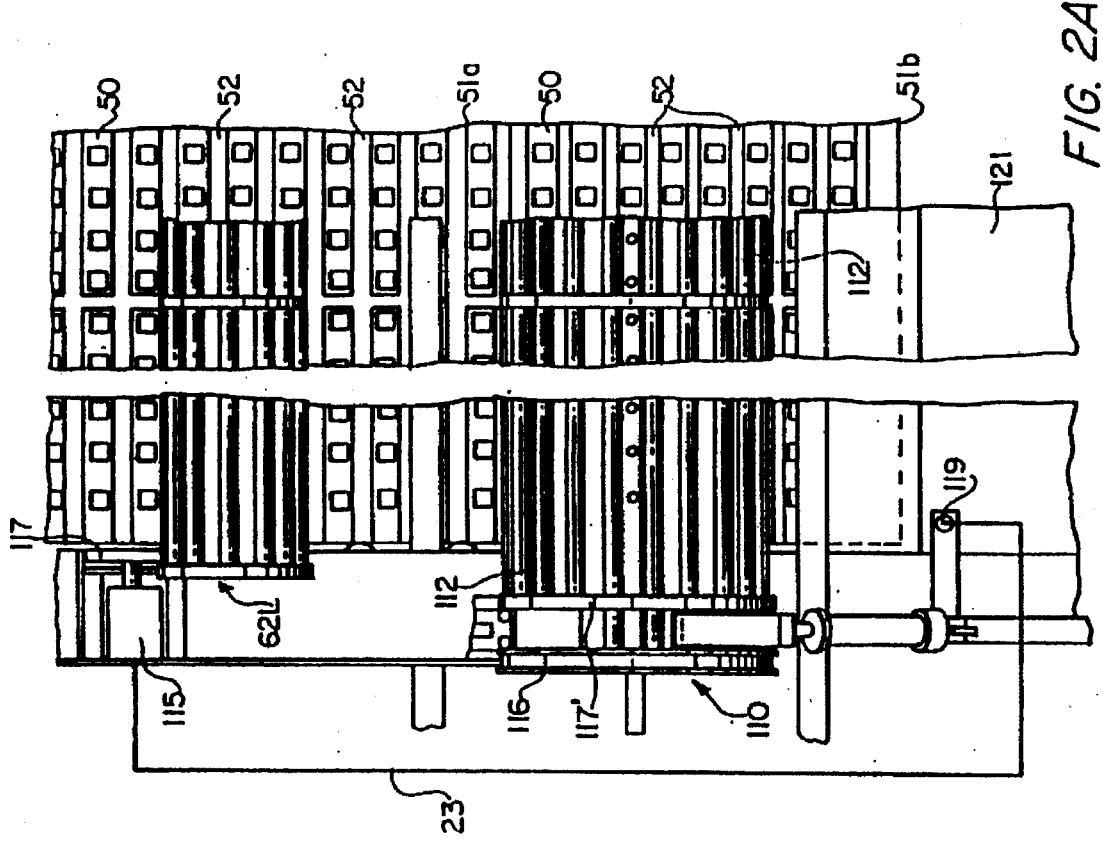
FIG. 2A is a front elevation view of the transplanter showing an upper plant tray being urged vertically downwardly by the down loader drum and contacting a lower tray which is engaged with the indexing drum and from which plants are being ejected.
Figure 3A:
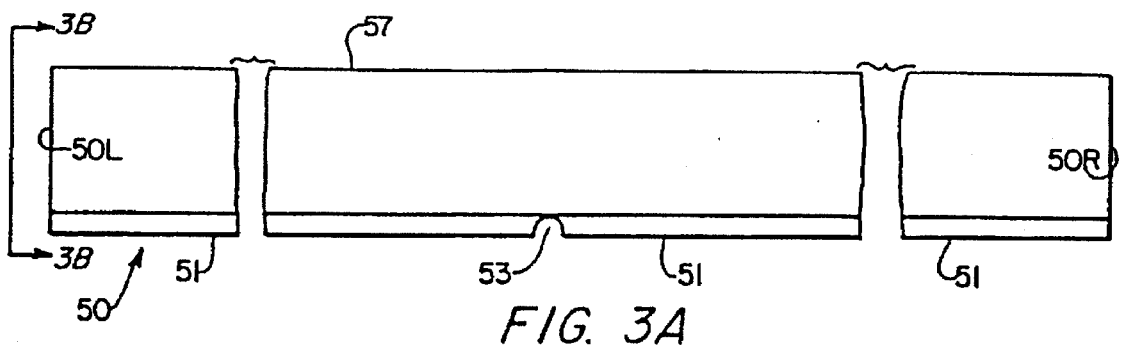
FIG. 3A is a front elevation view of the plant flat of FIG. 3.
Figure 3B:
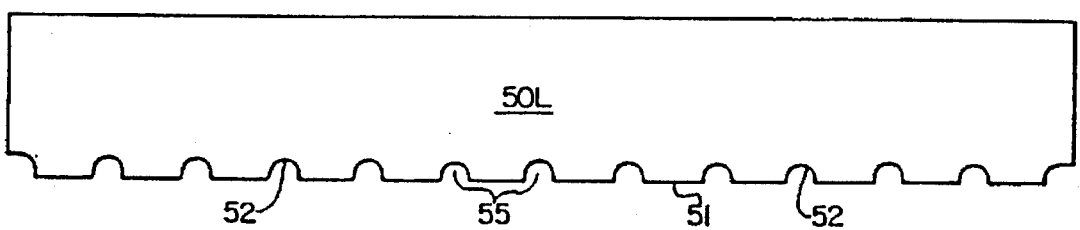
FIG. 3B is an end elevation of the plant flat as viewed from line 3—3 of FIG. 3A.
Figure 3:
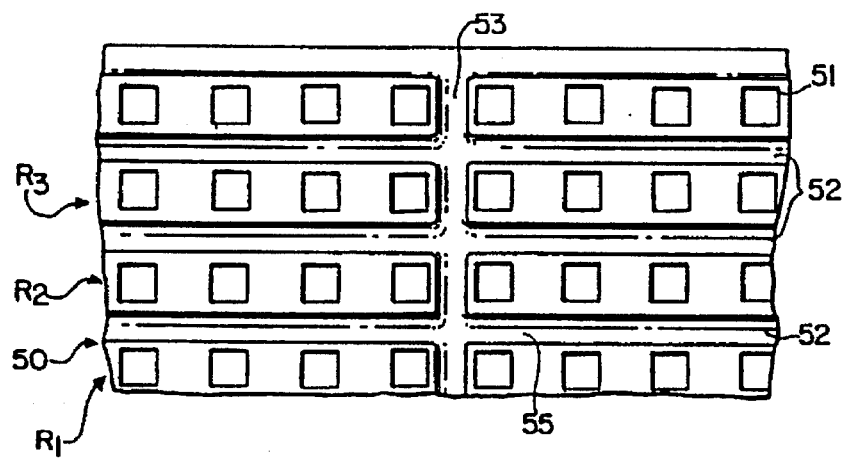
FIG. 3 is a bottom plan view of a plant flat or tray employed with the present invention.
Figure 15:
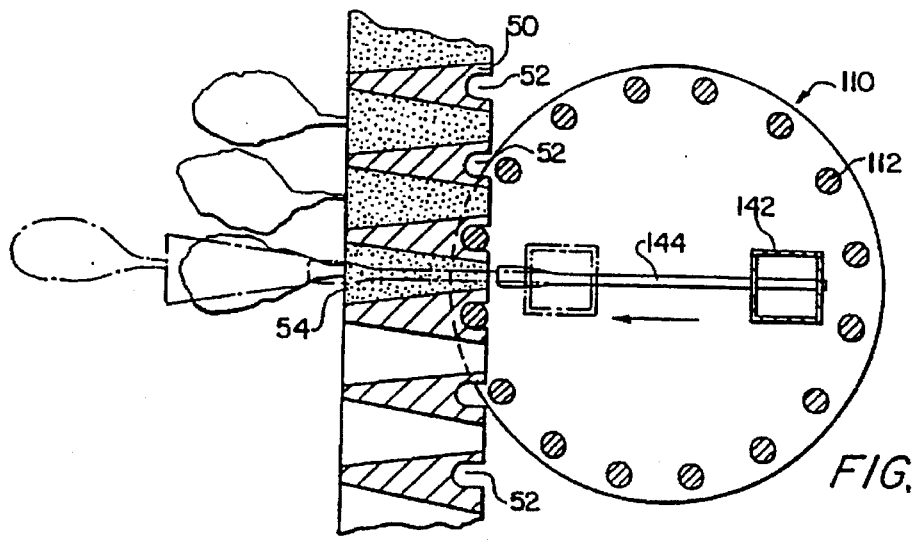
FIG. 15 is a side elevation partial section view of the indexing drum and the preferred plug ejection mechanism illustrating the manner of ejecting plants from a plant tray.

Referring initially to FIGS. 3, 3A and 3B, an expanded polystyrene plant tray 50 similar to the tray of Todd, U.S. Pat. No. 3,667,159, as used in the automatic transplanter of the present invention is shown. However, unlike the tray of Todd, horizontal longitudinal indexing grooves 52 are formed in the bottom surface 51 of the tray between rows of tapered pyramid shaped plant cells 54 (FIG. 15). Indexing grooves 52 have a width equal the diameter of indexing rods 112 of an indexing drum 110 (FIGS. 15 and 2A) and down loader rods 58 of down loader drums 62U and 62L (FIG. 1A) and have their inner extent defined by cylindrical surfaces 55 which mate with rods 112 and 58 (FIGS. 2 and 15). Indexing grooves 52 comprise drive member receiving means for mechanically powering plant trays 50 in a vertically downward direction in a loading frame 60 (FIG. 1) and for accurately indexing the lowermost plant tray 50 to bring successive longitudinal rows R1, R2 (FIG. 3), etc. into the proper position for simultaneous ejection of all plugs from the plant cells 54 (FIG. 15) of each successive longitudinal row.

When a first plant tray 50 is placed in the upper end of loading frame 60 (FIGS. 1 and 1A) it is positioned against backwall 61, FIG. 2, and manually pushed down until it initially engages an uppermost down loader drum 62U. The tray 50 (FIG. 1) is positioned between a vertical front guide flange 59F and a vertical rear guide flange 59R, as shown in FIG. 2. The flanges 59R and 59F are provided on both the right and left side frame members 60 so that the right vertical side edge 50R and the left vertical side edge 50L of tray 50 (FIG. 3A) are each positioned between a front flange 59F and a rear flange 59R (FIG. 2) which respectively engage the edge portions of the top surface 57 and the bottom surface 51 of the tray 50 (FIG. 3A) so that the tray can only move downwardly.

Figure 1:
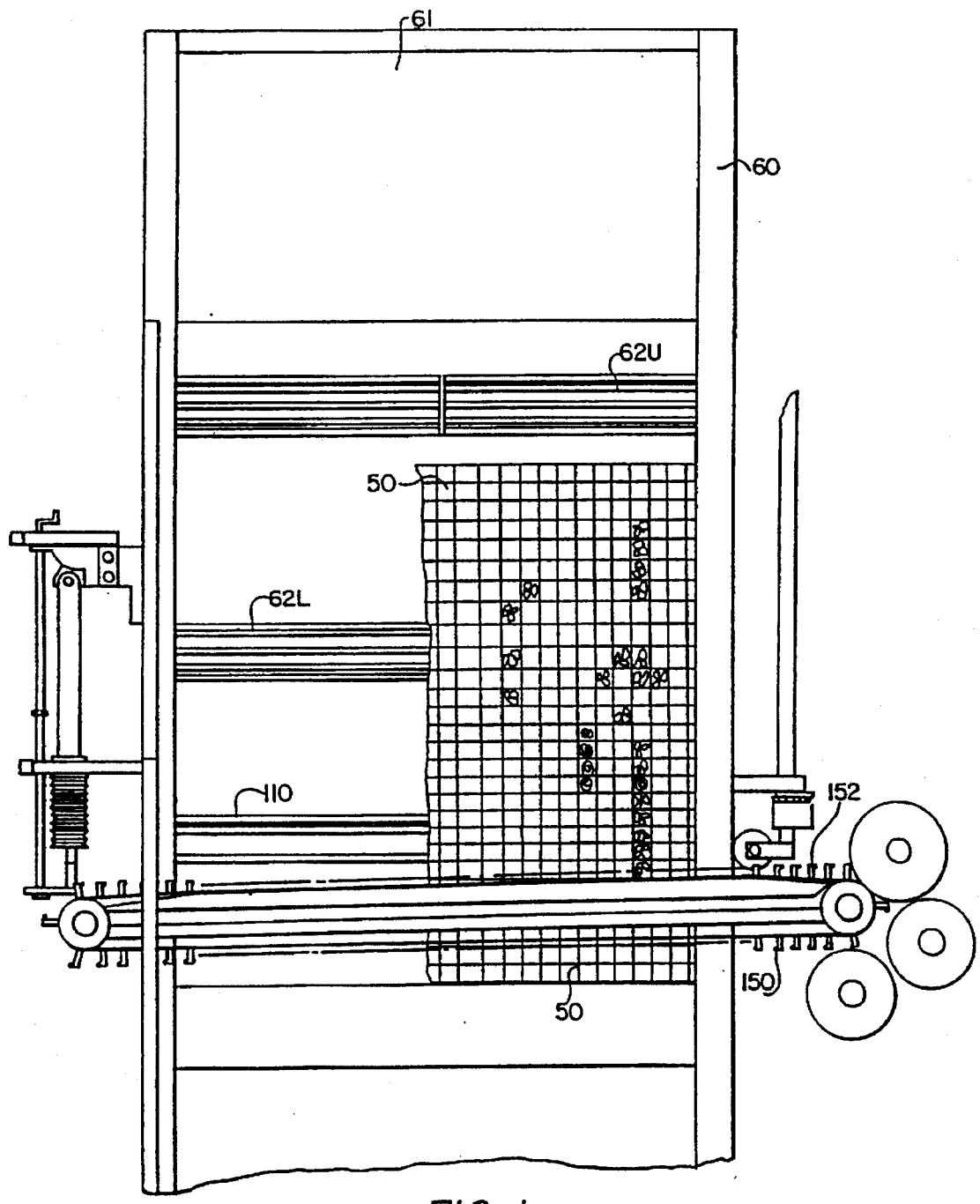
FIG. 1 is a front elevation of the preferred embodiment of the invention.
Figure 1D:
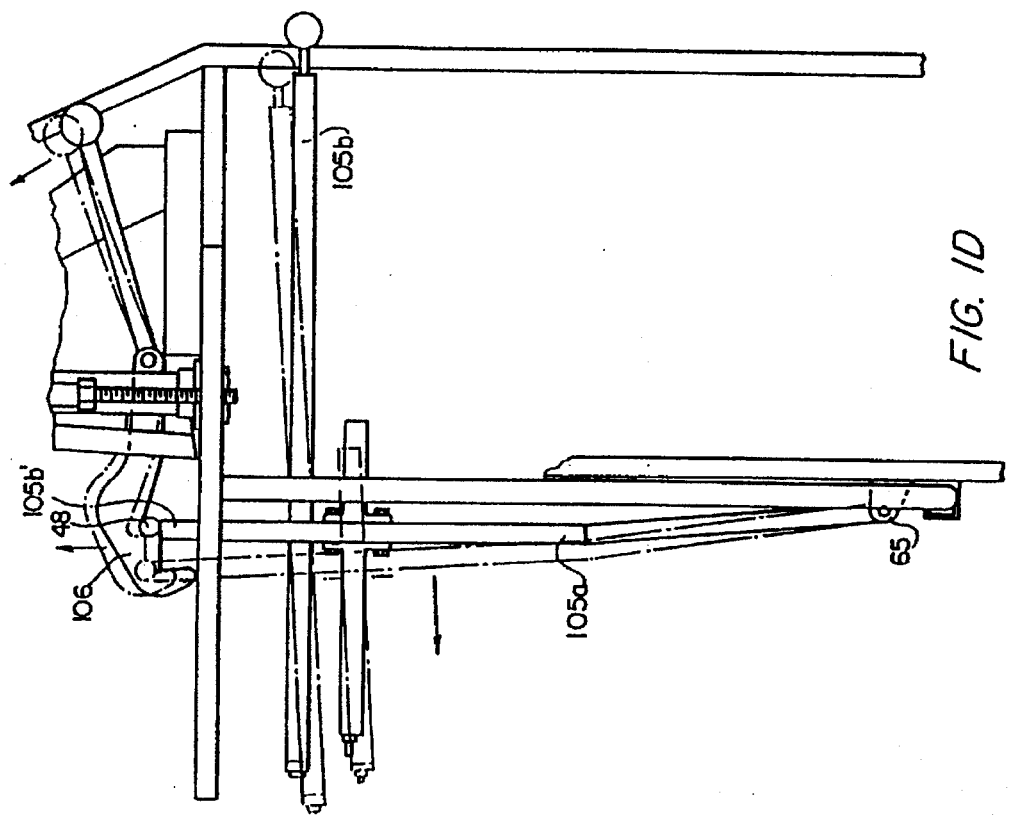
FIG. 1D is a view similar to FIG. 1A but illustrating the support frame and index drum in a deactivated position for permitting loading or rapid unloading of plant flats from the apparatus.
Figure 1E:
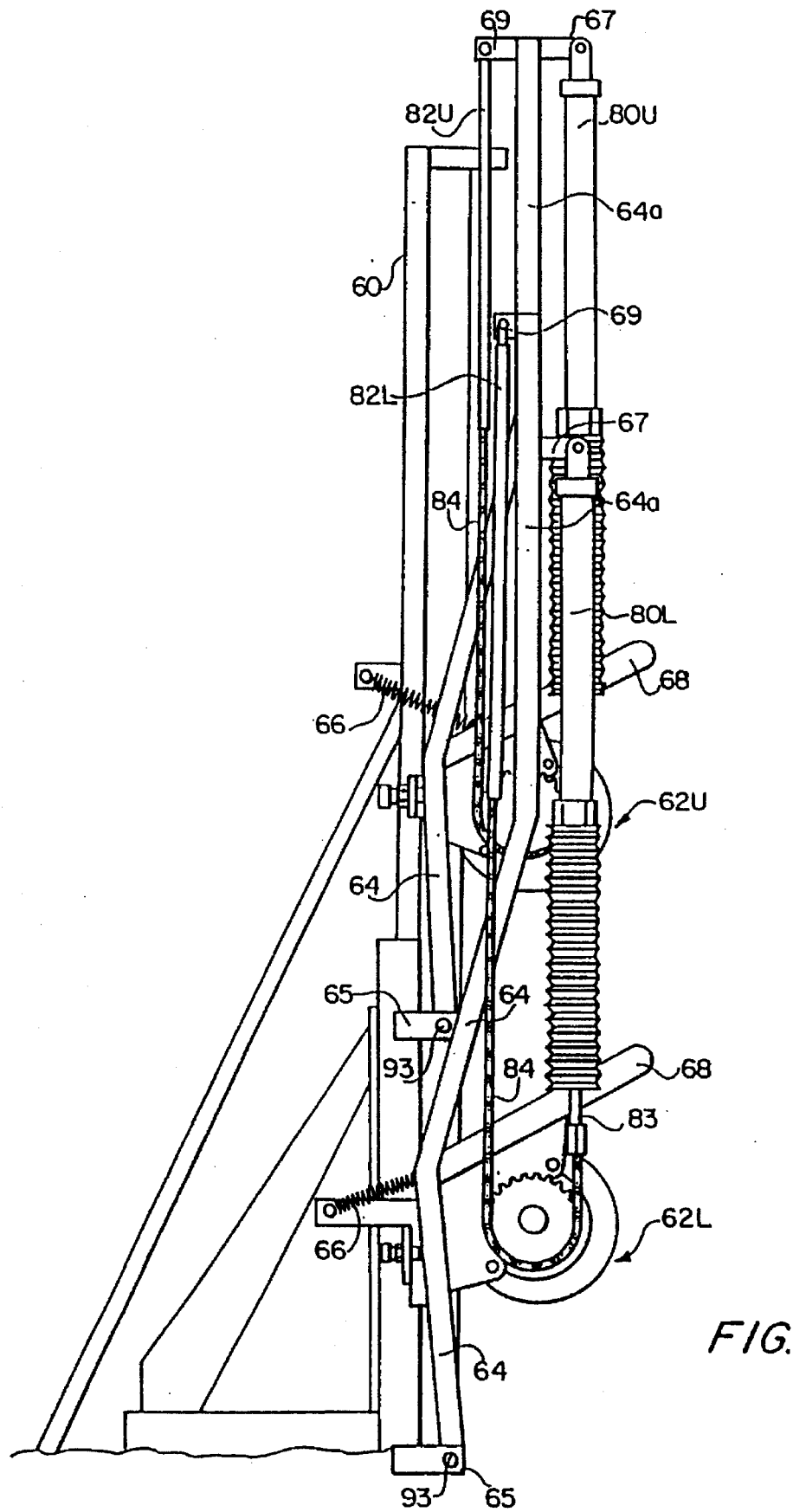
FIG. 1E is a right side elevation view of the preferred embodiment showing the pneumatic cylinder and return spring mounted on the down loader drum support frame.
Figure 2B:
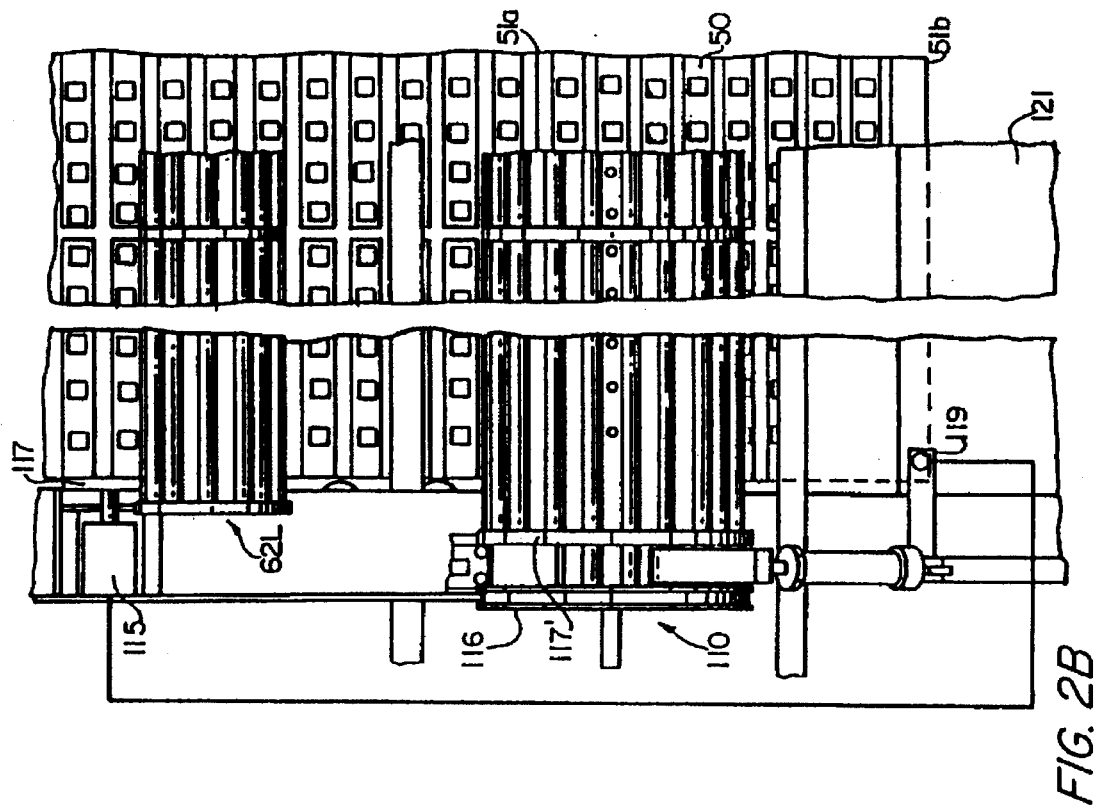
FIG. 2B is a front elevation view of the transplanter similar to FIG. 2A showing the relative positions of an upper and lower plant tray at the point when pneumatic locking cylinders are activated to grasp the upper plant tray prior to discharge of the lower empty tray.

Downloader drums 62U and 62L (FIGS. 1 and 2) are mounted to a pivotably mounted support frame 64 (FIG. 5A) pivotally attached to support frame 60 by pivot sleeves 65 mounted on pivots 93 on the right and left sides of frame 60, as shown in FIGS. 1A and 1E. Upper down loader drum 62U is biased toward the back side of loading frame 60, as shown in FIG. 1A, by springs 66 attached to the left and right ends of down loader drum support frame 64 (the left end springs being shown in FIG. 1A, and the right end springs 66 being shown in FIG. 1E).

Figure 4:
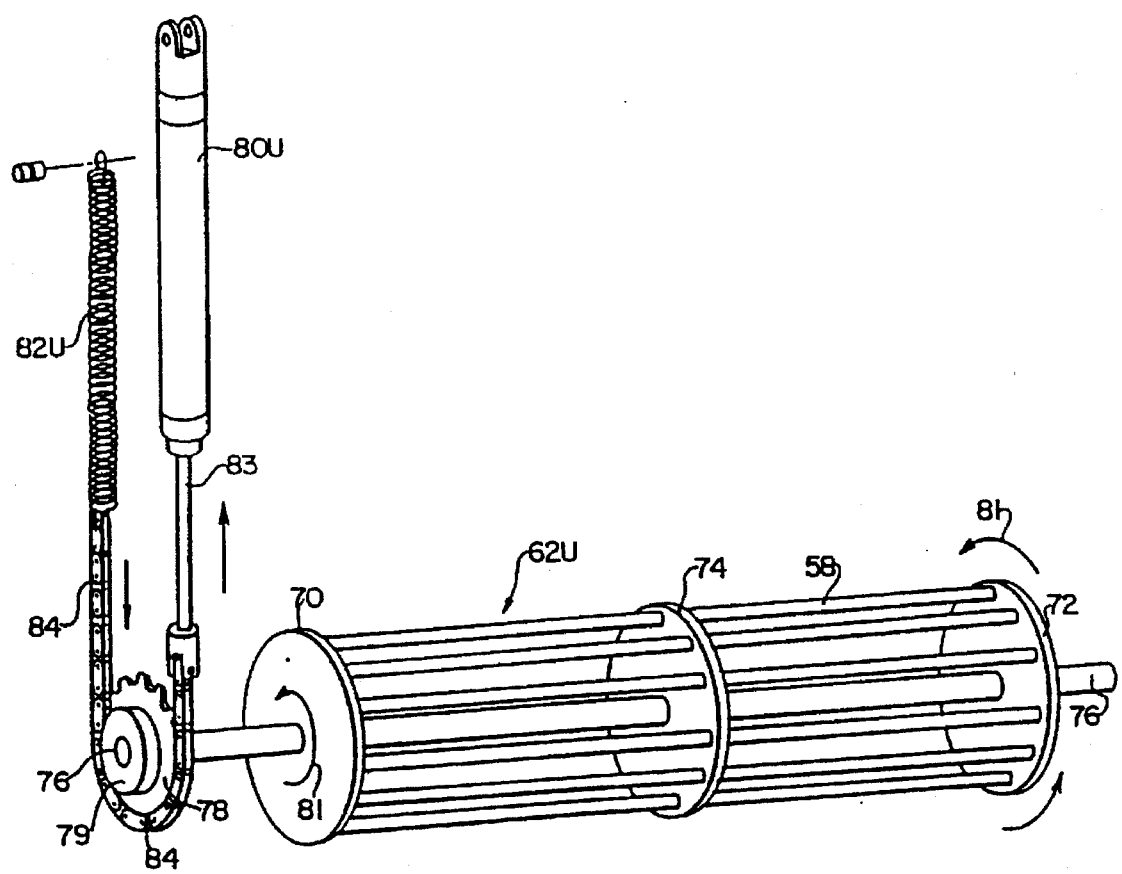
FIG. 4 is a rear perspective view of the preferred embodiment of the down loader drums employed in the invention and the associated drive means employed therewith.

As shown in FIG. 4, upper down loader drum 62U includes two circular end plates 70 and 72, one mid plate 74 and a central axial shaft 76. The outer circumference of mid plate 74 is configured to match the profile of a transverse alignment groove 53, shown in FIG. 3 and 3A, on the bottom surface of plant tray 50. Transverse alignment groove 53 is perpendicular to longitudinal indexing grooves 52 and centrally located on the bottom surface 51 of plant tray 50 midway between the opposite sides 50L and 50R of tray 50 (FIG. 3A). The engagement of down loader drum mid plate 74 (FIG. 4) with transverse alignment groove 53 (FIG. 3A) ensures that plant tray 50 is maintained in the proper position relative to upper down loader drum 62U (FIG. 1) during the loading operation.

In a preferred embodiment of upper down loader drum 62U, as shown in FIG. 4, ten stainless steel down loader rods 58 are arranged in a circular fashion to form an open drum. One end of down loader drum shaft 76 supports a sprocket 78 that is provided with a one way clutch 79 so that shaft 76 can be driven in one direction and allowed to free wheel in the opposite direction.

Rotation of shaft 76, and therefore upper down loader drum 62U in the direction of arrow 81, is effected by the application of air pressure to the lower end of upper pneumatic cylinder 80U which tends to effect retraction of pneumatic cylinder 80U which tends to urge upper down loader drum 62U to rotate in the direction of arrow 81. Return spring 82U and chain 84 effect rotation only of sprocket 78 in the direction opposite that of arrow 81. Chain 84 is wrapped around sprocket 78 with one end being connected to piston rod 83 of pneumatic cylinder 80U and the other end connected to return spring 82U which has its opposite end attached to a pivotable extension arm 64a at connection point 6g (FIG. 1E) to which one end of cylinder 80U and 80L (FIG. 1E) is also connected. As pneumatic cylinder 80U retracts and rotates shaft 76 and down loader drum 62U in the direction of arrow 81, return spring 82U is extended. Once the desired amount of rotation of down loader drum 62U is complete, pneumatic cylinder 80U exhausts and return spring 82U retracts, keeping constant tension on chain 84. Such retraction does not exert any rotary force on down loader drum 62U due to the one way drive connection between sprocket 78 and shaft 76.

Pneumatic cylinder 80U is pivotally mounted at its uppermost end to extension arm 64a (FIG. 1E). Extension arm 64a extends upwardly from the right side of down loader drum frame 64 as shown in FIG. 1E, and is provided with a cylinder bracket 67 to which the uppermost end of pneumatic cylinder 80U and spring bracket 69 is pivotally attached providing an adjustable connection to the uppermost end of spring 82U. The lower end of extension arm 64a is connected to down loader drum support frame 64 so that 64a and 64 are mounted for unitary pivotal movement.

The chordal distance between two adjacent down loader rods 58 is equal to the linear distance between horizontal longitudinal indexing grooves 52 on the bottom surface of plant tray 50. Therefore, as plant tray 50 (FIG. 5) is moved into a position adjacent down loader drums 62U or 62L (FIG. 1E), down loader rods 58 (FIG. 5) engage with indexing grooves 52 and thereby mechanically urge plant tray 50 (FIG. 5) downwardly when air pressure is supplied to pneumatic cylinder 80U or 80L (FIG. 1E).

Figure 5:
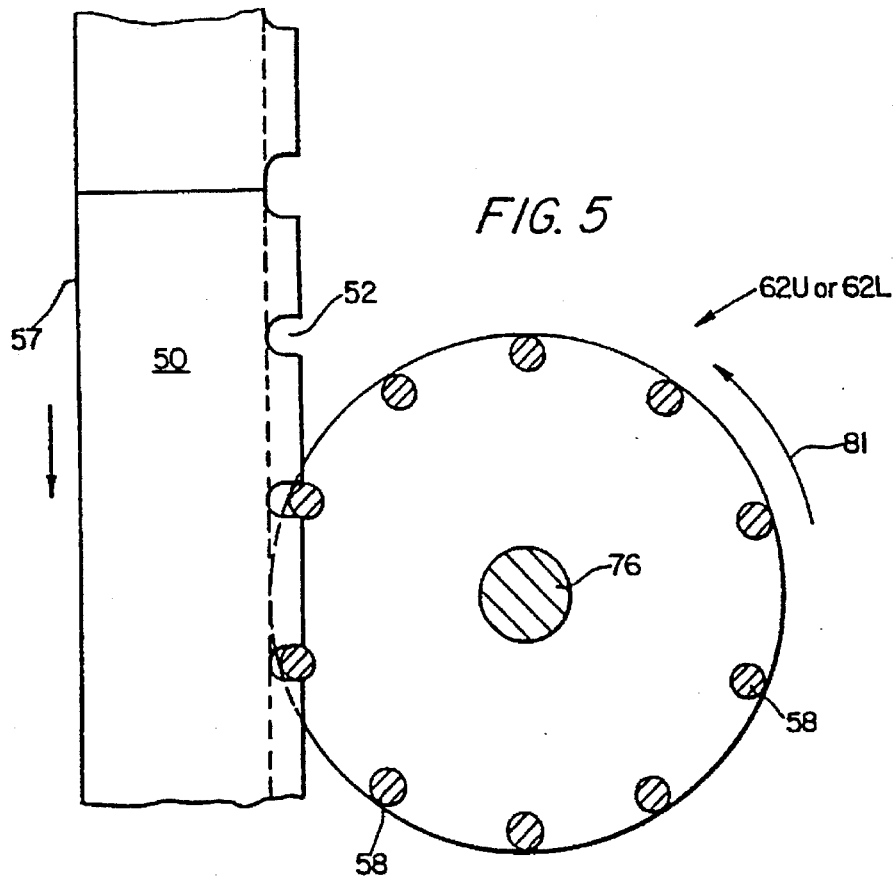
FIG. 5 is a side elevation view of the preferred embodiment of the down loader drum engaged with the indexing grooves on the bottom surface of a plant tray.
Figure 5A:
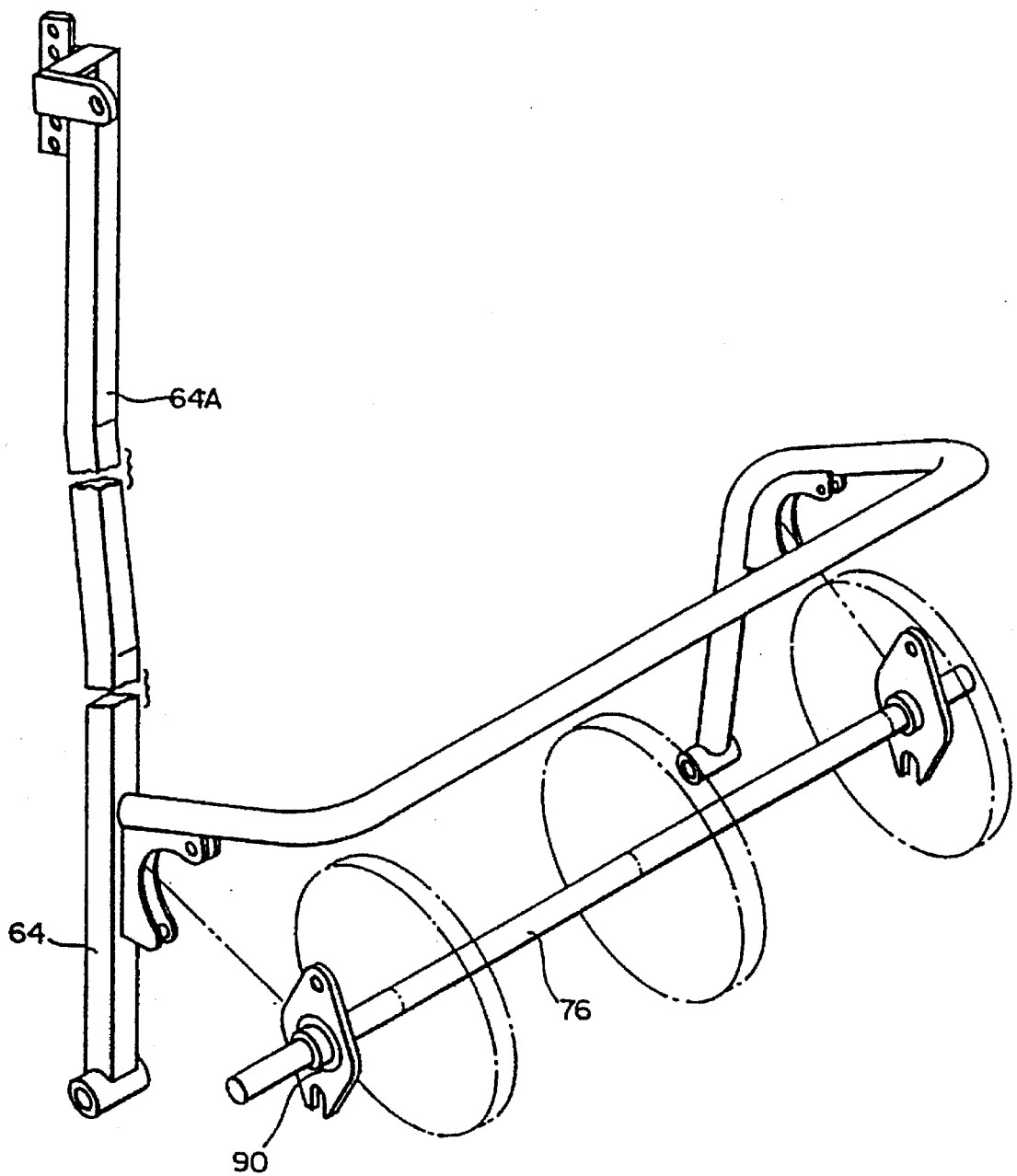
FIG. 5A illustrates the manner in which down loader drums are mounted.

Down loader drum shaft 76 is supported at each end by bearings 90, as shown in FIG. 5A, which are mounted by a quick release mechanism to down loader drum support frame 64, thereby allowing a quick and efficient change of down loader drum 62U to accommodate plant trays having different dimensions or spacings of indexing grooves 52 (FIGS. 3 and 3B).

A lower down loader drum 62L (FIG. 1A) identical to the upper down loader drum 62U is provided below drum 62U and is attached to the support frame in exactly the same manner as upper drum 62U.

Each down loader drum support frame 64 is pivotally mounted at its lower right and left end by pivot sleeves 65 supported on pivot pins 93 on the loading frame 60, as shown with respect to upper most down loader drum 62U in FIG. 1A and as shown with respect to upper and lower down loader drums 62U and 62L in FIG. 1E, and is biased towards loading frame 60 and into engagement with the lower surface of a plant tray 50 in loading frame 60 by a pair of springs 66 one of which engages the right end of frame 64 as shown in FIG. 1E and the other of which engages the left end of frame 64 as shown in FIG. 1A so as to bias the frame and its associated down loader drum to engage the bottom surface of any tray positioned adjacent the down loader drum.

Figure 6:
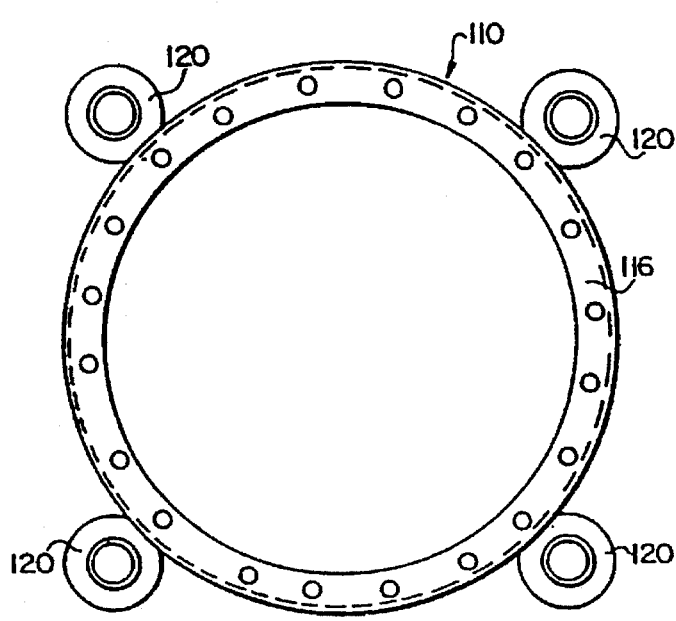
FIG. 6 is a side elevation view of the indexing drum and its associated support rollers.
Figure 7:
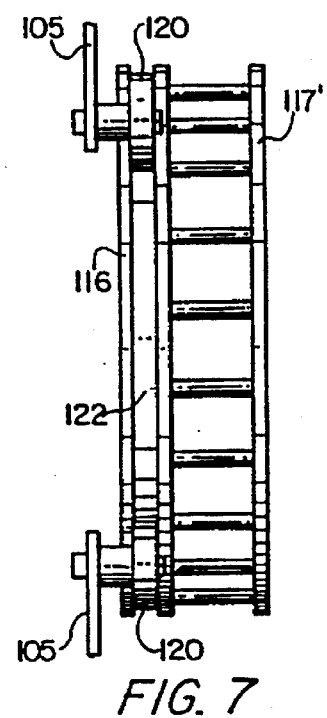
FIG. 7 is a front elevation view of one end of the indexing drum and its support rollers.

Down loader drums 62U and 62L urge plant tray 50 vertically downward into engagement with an indexing drum 110 (FIG. 10). Indexing drum 110 is formed from a plurality of parallel indexing rods 112 that are arranged in spaced parallel relationship into a drum shape and held together by circular end rings 114 and 116, an interior ring 117' and a mid ring 118 as shown in FIG. 8. Indexing drum 110 is supported by 8 rollers 120 (4 at each end) as shown in FIGS. 6 and 7. Rollers 120 engage in a machined slot 122 around the circumference of end rings 114 (FIG. 8) and 116 at each end of indexing drum 110 in the manner shown in FIG. 7. Rollers 120 are attached to a quick release indexing drum frame 105 which allows for quick and efficient change over of different indexing drums 110 to accommodate different plant trays 50.

Indexing drum frame 105 comprises two parallel, substantially vertical members 105a which are spaced apart by a distance slightly greater than the total transverse length of indexing drum 110 (FIG. 2A). These vertical members are pivotally attached by pivot sleeves 65 at their lower ends to main frame 60 as shown in FIG. 1A. Vertical members 105a are connected at their top ends by an upper cross member 105b' which is parallel to the central axis of indexing drum 110 and is positioned vertically above indexing drum 110 when a latch member 106, shown in FIGS. 1A and 1D, engages with a latch pin 48 attached to upper cross member 105b' to hold indexing drum frame in position as shown in FIG. 1A for driving engagement with plant tray 50.

Indexing drum frame 105 further comprises two annular roller support brackets 105c that are fixedly connected in vertical, parallel, spaced relationship at their top ends to upper cross member 105b' and at their lower ends to lower cross member 105b", best seen in FIG. 11. Annular roller support brackets 105c each rotatably support four rollers 120 with their axes of rotation horizontal and with rollers 120 engaged in the machined slots 122 around the circumference of end rings 114 and 116 at each end of indexing drum 110, as shown in FIGS. 6 and 7.

Pneumatic cylinder support bars 105d (FIG. 1A) are fixedly connected in horizontal, parallel, spaced relationship at the upper ends of vertical members 105a such that they extend perpendicular to vertical members 105a and perpendicular to the central axis of indexing drum 110. End portions 105d' of cylinder support bars 105d extend toward indexing drum 110 from the opposite ends of cylinder support bars 105d and receive therebetween a double rod pneumatic cylinder 107 at each end of indexing drum 110.

Figure 16:
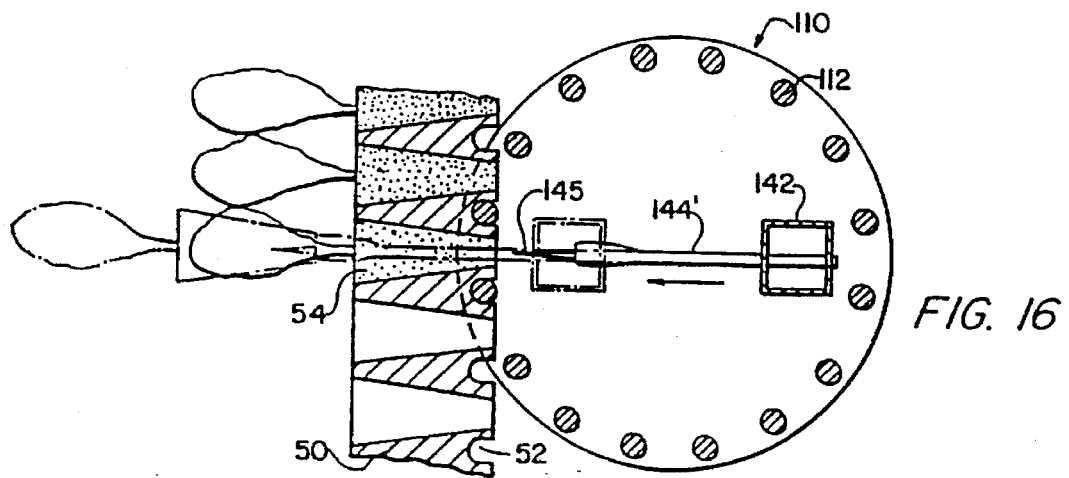
FIG. 16 is a side elevation view of the indexing drum and plug ejection mechanism similar to FIG. 16 but employing different plug ejection pins.

The ends of each of the cylinder rods of pneumatic cylinder 107 are connected to respective cylinder support bar end portions 105d', and the body of cylinder 107 is connected by an adjustable bracket 108 to a respective end of a pin mounting beam 142 (FIGS. 1B and 16). Pin mounting beam 142 (FIG. 16) carries a plurality of plug ejector pins 144 and extends from one adjustable bracket 108 (FIG. 1A) at one end of indexing drum 110, through the central cavity of indexing drum 110 and parallel to its central axis, and terminates at an identical adjustable bracket 108 at the opposite end of indexing drum 110. Adjustable brackets 108 allow for vertical and horizontal adjustments to the position of pin mounting beam 142 relative to indexing drum frame 105 and indexing drum 110.

Supply of compressed air to one side or the other of cylinders 107 causes the cylinder body to move either towards or away from loading frame 60 and thereby drives pin mounting beam 142 and plug ejector pins 144 (FIGS. 15 & 16) either toward or away from a plant tray 50 supported in loading frame 60 (FIG. 1) and engaged with two indexing rods 112 of indexing drum 110 (FIGS. 15 and 16) positioned above and below the plane within which pin mounting beam 142 is driven.

Adjustable bracket 108 (FIG. 1B) is connected to a pinion gear support bearing 109 that rotatably supports a pinion gear 111 (FIG. 1C) with its rotational axis horizontal and parallel to the central axis of indexing drum 110. Pinion gears 111 at each end of indexing drum 110 mesh with horizontal racks 113, which are attached to annular roller support brackets 105c (FIGS. 1B and 1C) in spaced, parallel relationship below pinion gears 111 to guide pinion gears 111, and therefore adjustable brackets 108 and pin mounting beam 142 in their movement towards and away from loading frame 60.

Figure 20:
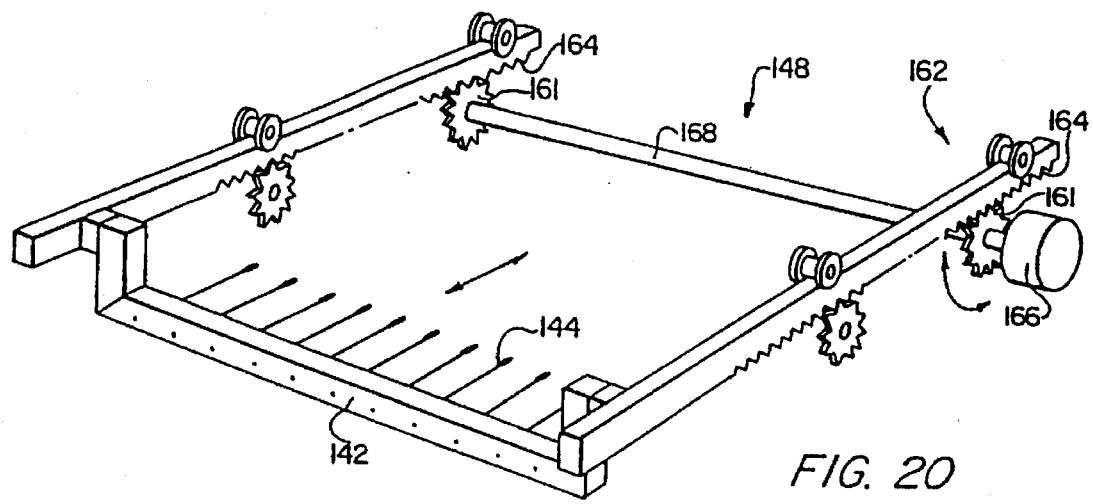
FIG. 20 is a perspective view of a fourth embodiment of the plug ejection mechanism.

Pinion gears 111 are connected by a torsional shaft 168, as best seen in the embodiment shown in FIG. 20, in order to ensure that each gear rotates the same amount and maintains the pin mounting beam 142 parallel to the central axis of indexing drum 110 throughout an entire plug ejection stroke. An additional stop bar 125, shown in FIG. 1A, is fixedly connected to each vertical member 105a and positioned below and parallel to each pneumatic cylinder support bar 105d in order to provide stops at each end of the path traveled by pin mounting beam 142 during a complete plug ejection stroke.

As with the mid plate 74 of down loader drum 62 (FIG. 4), mid ring 118 of indexing drum 110 has an outer circumference shaped to conform to the profile of transverse alignment groove 53 on the lower surface of plant tray 50. This configuration is shown in FIG. 9, and allows the mid ring 118 to centralize and guide plant tray 50 during its downward movement.

Pneumatic locking cylinders 115, shown in FIGS. 10, 2A and 2B, are mounted on both sides of loading frame 60 (FIG. 11) at a point vertically above the lower down loader drum 62L, and positioned to actuate press plates 117, shown in FIGS. 2A, 2B, 10 and 11, horizontally inwardly to lock an upper plant tray 50 in fixed position at a predetermined time during its down feed past down loader drums 62U and 62L. A sensor 119, shown in FIGS. 2A and 2B is mounted to look through a hole in a kick-out plate 121 positioned below indexing drum 110 as shown in FIGS. 2A and 2B. Kick out plate 121 serves the purpose of ejecting a lower plant tray 50 after it has been indexed completely past indexing drum 110 and has been completely emptied of seedlings.

Sensor 119 is positioned to detect the bottom edge 51b of lower plant tray 50 when plant tray 50 has been driven downwardly to the position where the second row of plant cells 54 down from the top edge 51a of plant tray 50 is in the same horizontal plane as pin mounting beam 142 and thereby positioned for ejection of the seedlings.

A signal generated by sensor 119 is sent to a processor (not shown) and translated into an actuation signal to pneumatic locking cylinders 115 (as represented schematically by the line 123 extending from sensor 119 to pneumatic locking cylinder 115 in FIGS. 2A and 2B).

Figure 28:
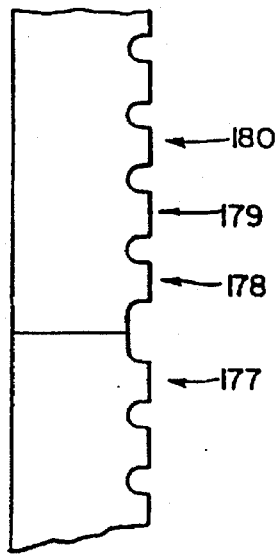
FIG. 28 is a side elevation view of an upper and lower plant tray contacting each other along one edge.
Figure 29:
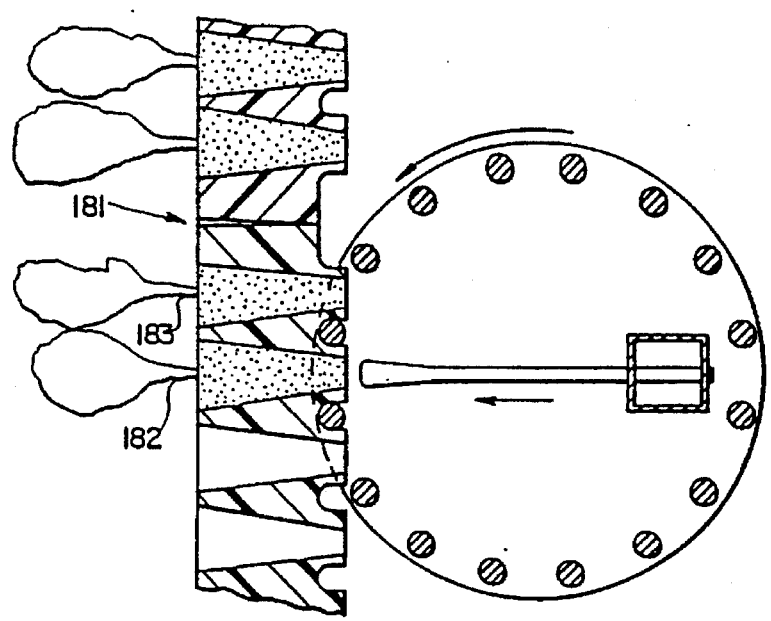
FIG. 29 is an enlarged side elevation view of the indexing drum and plug ejection mechanism and upper and lower plant trays being fed into position for ejection of seedlings.
Figure 30:
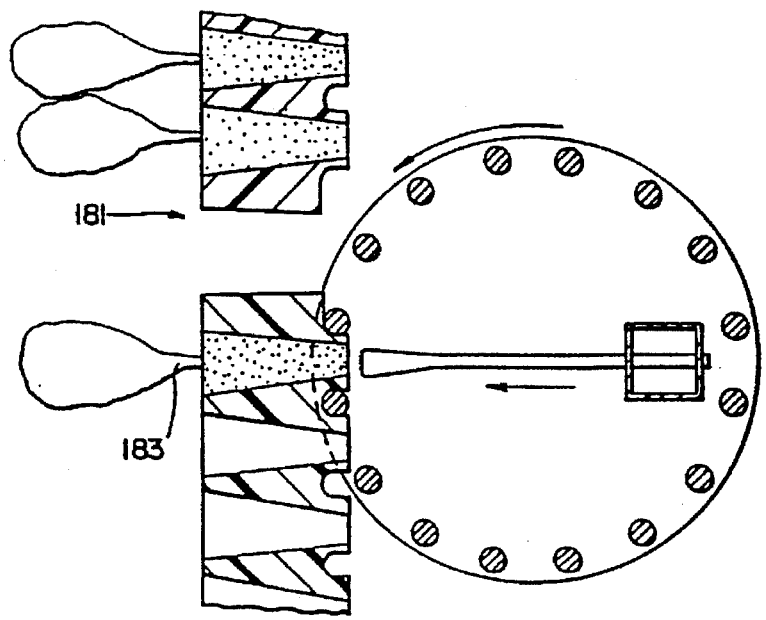
FIG. 30 is a side elevation view similar to FIG. 29 showing the upper plant tray locked in position while the lower plant tray is indexed downward.
Figure 31:
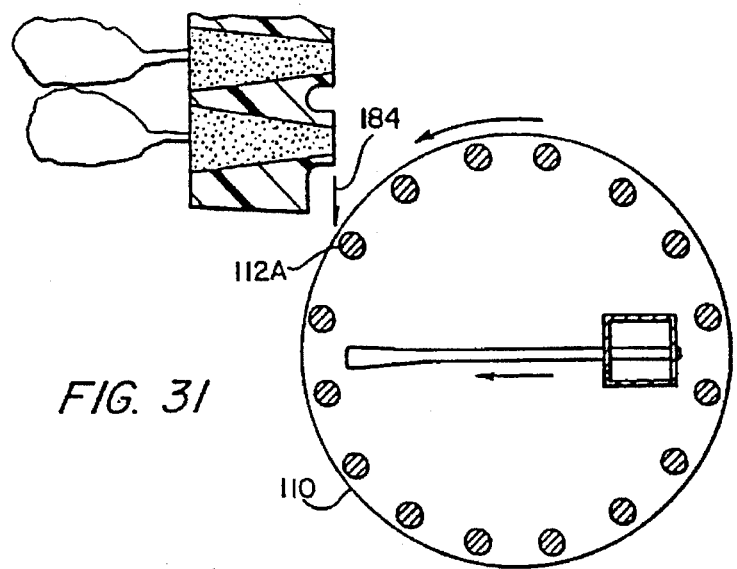
FIG. 31 is a side elevation view similar to FIG. 29 showing the upper plant tray being downloaded after emptying of the lower plant tray.

The purpose of locking an upper plant tray 50 that is being driven downwardly by down loader drum 62 at the point when a lower plant tray being indexed downwardly by indexing drum 110 is positioned for ejection of the second row of seedlings from the top edge of the lower tray, as shown in FIG. 2B, is to compensate for the differential spacing (caused by the requirement of an expanded polystyrene tray to have a wide outer edge to retain strength) between the top row of plant cells 177 (FIG. 28) in the lower tray and the bottom row of plant cells 177 and 178 in the upper tray. The variation of this spacing from the spacing between transverse rows of plant cells 178, 179 and 180 on a single plant tray would result in a misalignment of plug ejector pins 144 with plant cells 54 (FIGS. 15 and 16) if the upper plant tray were not locked in position 181 (FIG. 29) from the time the lower plant tray was positioned to eject the second row of plants 182 until the lower plant tray had been indexed to the last row of seedlings (top row 183, FIG. 30) then completely past indexing drum 110 and emptied of all seedlings (FIG. 31).

The top two rows of seedlings in the lower plant tray being indexed downwardly by indexing drum 110 are ejected by plug ejector pins 144 while an upper plant tray is locked in position by locking cylinders 115 in order to ensure that the upper plant tray will not be driven downwardly by down loader drums 62U and 62L into engagement with indexing rods 112 until the lower plant tray has been completely emptied of seedlings. The downloader drums 62U and 62L are switched off and locking cylinders 115 prevent gravity from causing the upper plant tray to fall.

Figure 32:
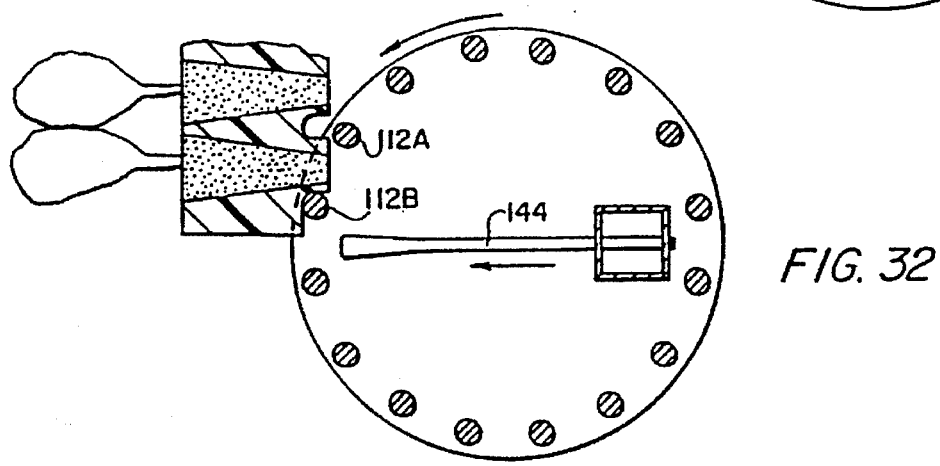
FIG. 32 is a side elevation view similar to FIG. 29 showing the upper plant tray engaging with the indexing drum.
Figure 33:
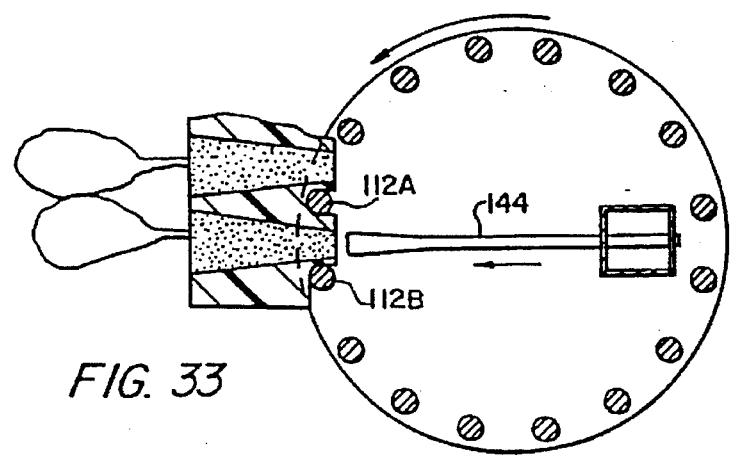
FIG. 33 is a side elevation view similar to FIG. 29 showing the ejector pins in position to eject a row of seedlings from the upper plant tray.

Once the lower plant tray has been indexed clear of indexing drum 110, the press plates 117 (FIGS. 2A, 2B, 10 and 11) unlock the upper plant tray and the downloader drums 62U and 62L (FIG. 1A) are switched on causing the upper tray to move downward free from obstruction in the direction of arrow 184 (FIG. 31) and remaining clear of the indexing drum rod 112 until the plant tray engages on indexing drum rod 112B (FIG. 32). The index drum is then indexed one position so that indexing drum rods 112A and 112B (FIG. 33) are spaced evenly either side of the centre line of the bottom row of plant cells in the upper tray and the ejector pins 144 (FIG. 33) are on the centre line of the plants to be ejected.

To ensure speed and accuracy of operation during the indexing of plant tray 50 (FIG. 15) in a downward direction from one row of plant cells 54 to an adjacent row of plant cells, it is necessary to provide for rapid indexing of the indexing rods 112 (FIGS. 15 and 16) without skipping or overrunning successive plug ejection positions. A means for intermittently rotating indexing drum 110 about its central axis and positively engaging indexing drum 110 in successive plug ejection positions is provided by the drive pawl 138 and a special indexing lock mechanism shown in FIGS. 11, 12, 13 and 14.

Indexing drum 110 is rotated in a clockwise direction as viewed in FIG. 11 by a drive pawl 138 driven by a pneumatic cylinder 133 that is pivotally mounted at one end to vertical frame member 105a by bracket 139. Spring 131, connected between indexing drum frame 105 and drive pawl 138, biases drive pawl 138 into engagement with successive indexing rods 112 as each successive activation of pneumatic cylinder 133 results in clockwise rotation of indexing drum 110.

In a preferred embodiment, as shown in FIGS. 11–14, an index lock pawl member 128 is provided having a plurality of lock lobes 130, a plurality of cam lobes 132, a pivot opening mounted on a pivot pin 134 on fixed frame 105, as shown in FIG. 11, and an attachment point 136 for attachment to pneumatic cylinder 124, which is mounted to an upwardly extending portion of frame 105. Cam lobes 132 are disposed in between lock lobes 130 and provide a means for allowing the rotation of indexing drum 110 to assist the oscillation of index lock pawl member 128 generated by pneumatic cylinder 124.

Referring to FIG. 11, indexing drum 110 is positively positioned in a first indexed position by the contact of indexing rod 112b against lock lobe 130a of pawl member 128 with the resultant force being transferred directly through pawl member pivot pin 134 which is fixed to the support frame 105 for indexing drum 110. Indexing drum 110 is thereby firmly positioned in a first plug ejection position. With indexing drum 110 in this first position, two adjacent indexing rods 112 are engaged with two adjacent longitudinal indexing grooves 52 located on both sides of a row of plant cells 54 on plant tray 50 (FIGS. 15 and 16). When in this first plug ejection position, the row of plant cells 54 lie in a common horizontal plane with the central axis of indexing drum 110 (FIGS. 15 and 16). This arrangement ensures the proper alignment of the plug ejection mechanism, which is mounted to the indexing drum frame, with the row of plant cells 54. The plug ejection mechanism includes pin mounting beam 142 that extends through the central cavity of indexing drum 110 and carries a series of plug ejector pins 144 (FIGS. 15 and 16) for entering drain holes at the bottom of each plant cell to eject plugs and seedlings contained within each plant cell.

Figure 12:
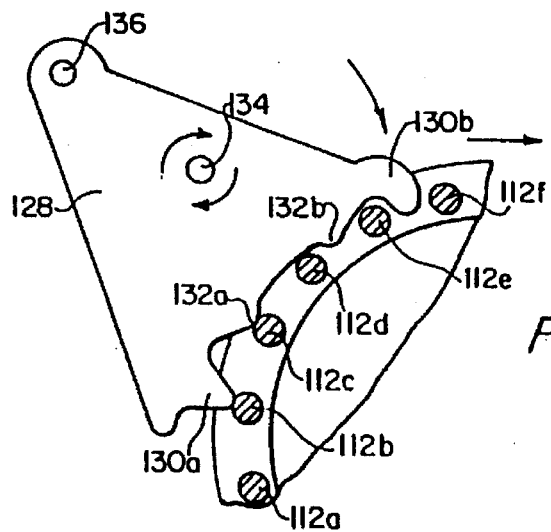
FIG. 12 is a side elevation view of the pawl member of FIG. 11 in a second position immediately following the initiation of an indexing movement.
Figure 13:
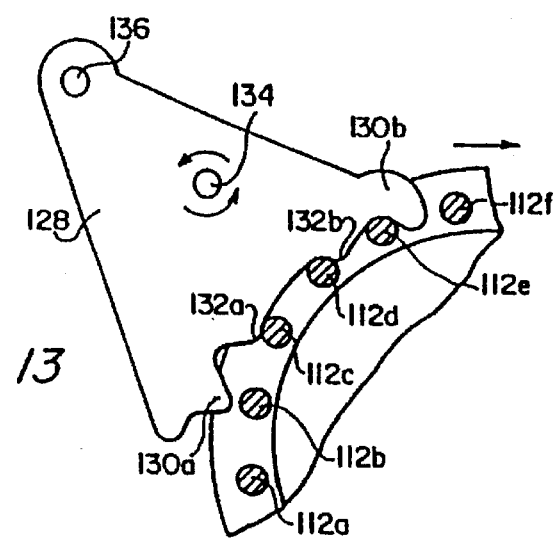
FIG. 13 is a side elevation view of the pawl member of FIG. 11 in a third position subsequent to the FIG. 12 position.

When indexing drum 110 is rotated about its central axis in a clockwise direction, as shown in FIGS. 11 through 14, pawl member lock lobe 130a disengages from indexing rod 112b and cam lobe 132a rides over an adjacent indexing rod 112c, thus providing a mechanical assist to pneumatic cylinder 124 which is exerting a force at attachment point 136 to rotate pawl member 128 about pivot pin 134 in a clockwise direction as viewed in FIG. 12. Lock lobe 130b is thereby rotated into a position between adjacent indexing rods 112e and 112f as shown in FIGS. 12 and 13.

When indexing rod 112e is locked against lock lobe 130b as shown in FIG. 13, indexing drum 110 is half way to the next successive plug ejection position of indexing drum 110 after the plug ejection position shown in FIG. 11. The rotation of indexing drum 110 to the position shown in FIG. 13 is detected by a sensor 126. Sensor 126 is mounted on a bracket 127 fixed to indexing drum frame 105, as shown in FIG. 11. Sensor 126 generates a signal when indexing rod 112 passes close by one end of the sensor and this signal is input to a processor (not shown) which in turn sends an activation command to pneumatic cylinder 124 connected to attachment point 136 on pawl member 128. The activation of pneumatic cylinder 124 to drive pawl member 128 in a counterclockwise direction, as shown in FIG. 13, tends to disengage lock lobe 130b from indexing rod 112e.

Figure 14:
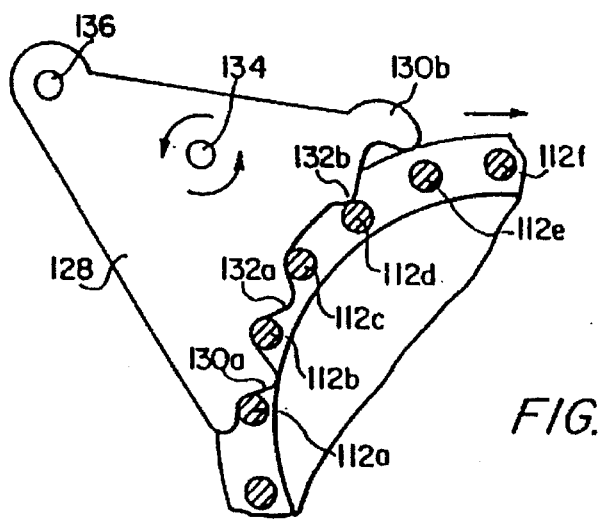
FIG. 14 is a side elevation view of the pawl member of FIG. 11 in a fourth position subsequent to its FIG. 13 position.

The clockwise rotational force being applied to indexing drum 110 is conveyed through cam lobe 132b as shown in FIG. 14 to assist in the rotation of pawl member 128 about pivot point 134 in a counterclockwise direction as viewed in FIG. 14. Cam lobe 132b is not free from the rotational force being applied by indexing rod 112d until lock lobe 130a is fully engaged between indexing rod 112a and indexing rod 112b. Continued clockwise rotation of indexing drum 110 locks indexing rod 112a against lock lobe 130a, thereby engaging indexing drum 110 in its next successive plug ejection position. The entire cycle is repeated to advance indexing drum 110 to successive plug ejection positions, thereby providing a high speed positive locking indexing method.

A rachet bar 135, shown in FIG. 11, is pivotally mounted on pivot pin 134 and biased by spring 129 to engage indexing rods 112 after each successive plug ejection position is reached. Rachet bar 135 prevents counterclockwise rotation of indexing drum 110.

Because of slight variations in the lengths of plant trays 50, and therefore the distance between cells 54, a waisted shank 144' is provided on plug ejector pins 144 to allow for sideways deflection of pins 144, as shown in FIG. 16. The heads of pins 144 can also be provided with tapered spikes 145 that enter the bottom of a plug prior to it becoming dislodged from plant cell 54. Tapered spikes 145 ensure that the plugs will not shift relative to the ejector pins 144 during the ejection process, and will therefore be fully ejected before separating from pins 144. When pins 144 are retracted by movement of pin mounting beam 142 back away from the plant tray, tapered spikes 145 easily dislodge from the plugs while leaving the plugs in their fully ejected position.

Figure 17:
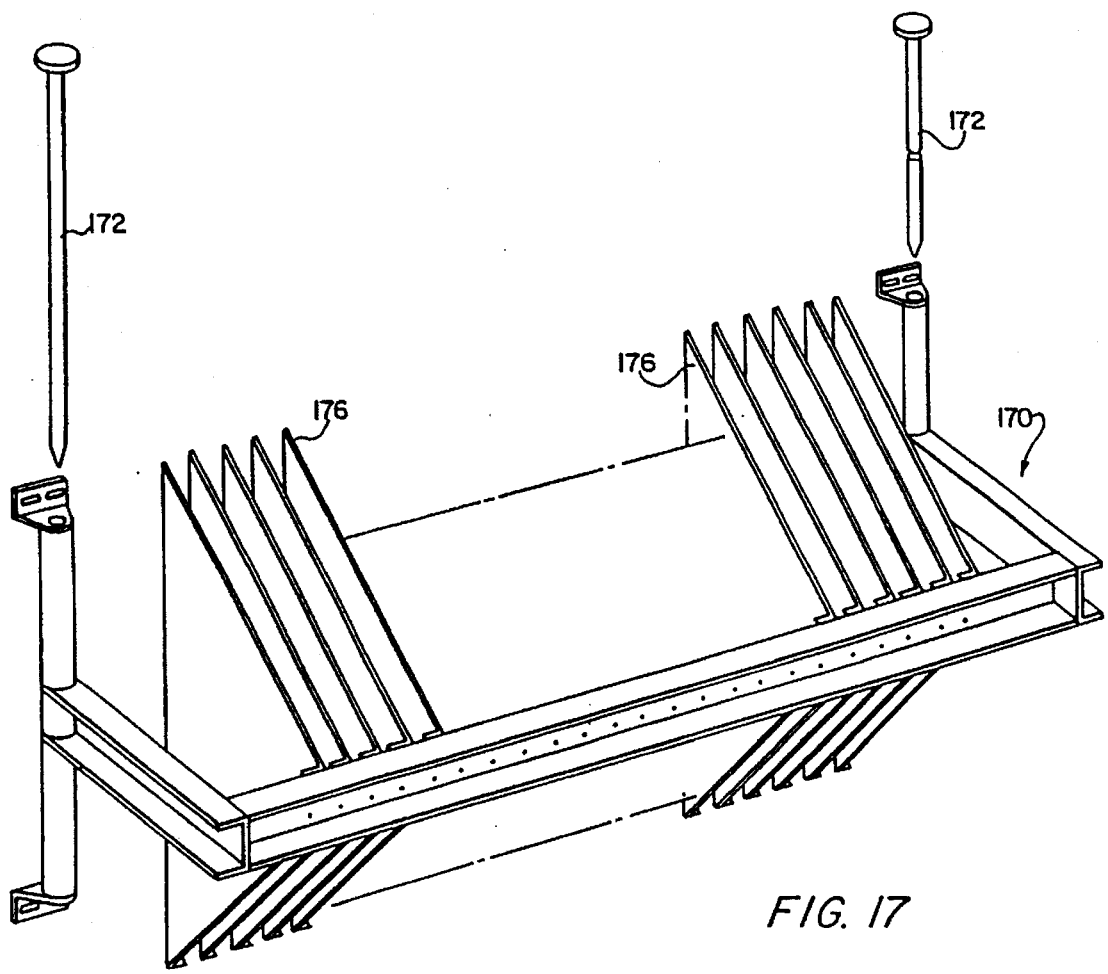
FIG. 17 is a perspective view of a plant foliage separator comb assembly used for separating and downwardly guiding plants ejected from the plant tray.

As shown in FIG. 1A and FIG. 17, a vertical plant foliage separator comb assembly 170 is mounted to the front side of loading frame 60 opposite from indexing drum 110 and lower down loader drum 62L. Comb assembly 170 separates any entangled stems and foliage enabling clear and easy transfer from plant tray 50 onto conveyer 150 in between plug retainers 152. Comb assembly 170 is easily removed from loading frame 60 as a modular component by pulling pins 172 shown in FIG. 17 and removing comb assembly 170 for quick and efficient changes to accommodate plant trays 50 having different numbers of plant cells 54.

Figure 34:
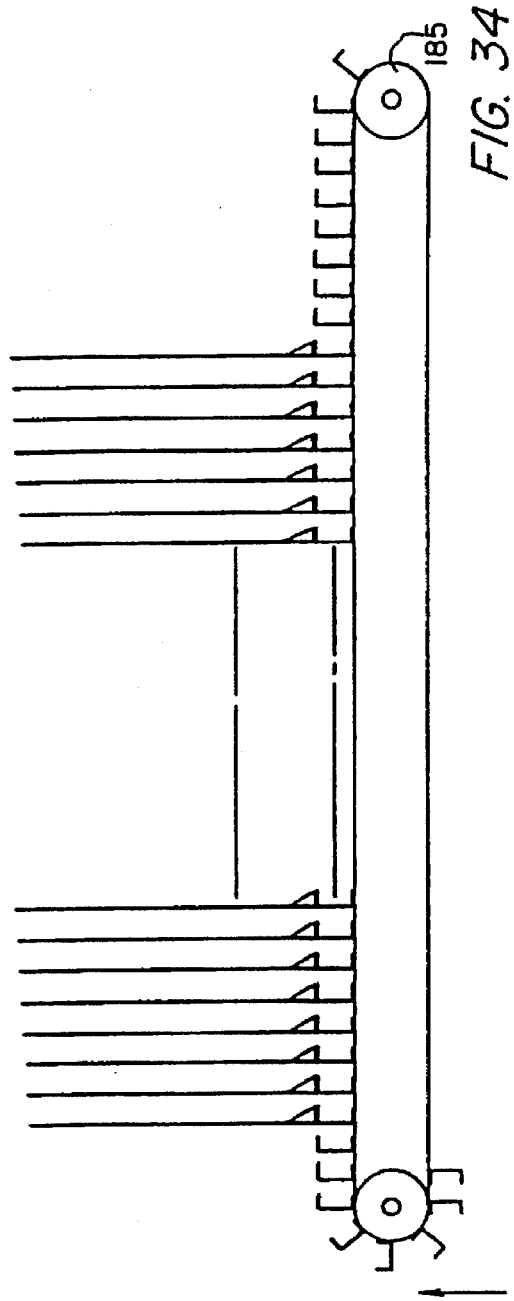
FIG. 34 is a front elevation view of a first embodiment of the conveyor belt in position below the comb assembly.
Figure 35:
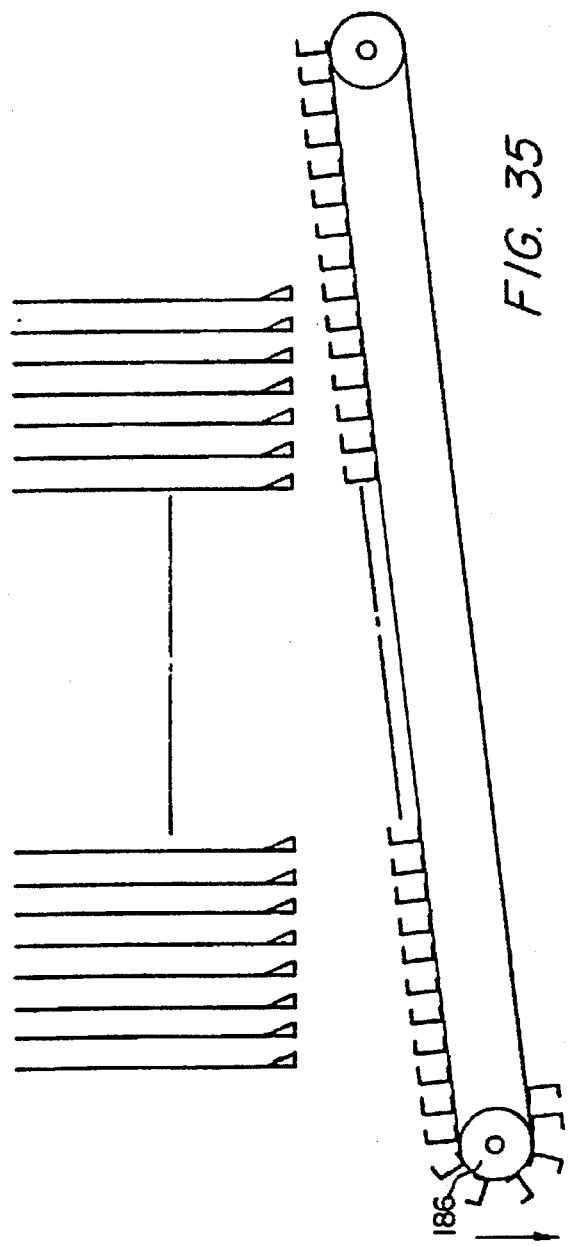
FIG. 35 is a front elevation view similar to FIG. 34 with the first embodiment of the conveyor belt in a lowered position.

Angular side guides 174, shown in FIG. 21, are provided at the bottom of individual plates and in one preferred embodiment of the invention can be extended the full length of 176 making up comb assembly 170 (FIG. 1A). Plug retainers 152 mounted on conveyer 150 engage the base of angular side guides 174 during the ejection of plugs from plant trays 50 in order to ensure that any crooked plant stems are retained and guided into the correct plug retainer 152. Conveyer 150 and plug retainers 152 must be moved downwardly away from angular side guides 174 before conveyer 150 is rotated in order to convey the plant seedlings to a planting position. This ensures that any foliage of plant seedlings that have been previously separated into vertical columns by comb assembly 170 (FIG. 1A), but may still be partially engaged with plant seedlings above which could cause misalignment or damage when plant ejection occurs or when conveyer belt 150 is rotated, are clearly separated by the lowering of conveyer 150. Conveyer 150 is lowered by either pivoting about one roller 185 and lowering one end of the conveyor 186 as shown in FIGS. 34 and 35 or by the use of a parallelogram type linkage as shown in FIGS. 21 and 22.

Details of the apparatus and method for transferring seedlings along conveyor 150 and subsequently planting the seedlings in the ground are provided in PCT application #PCT/AU93/00408, which is herein incorporated by reference. These details are not essential to an understanding of the claimed invention.

The layer of foam rubber 92 in an alternative embodiment of down loader drums 62U and 62L shown in FIG. 23 deforms in order to provide a nearly constant force at the point of contact with plant tray 50. The deformation of foam rubber layer 92 causes down loader drum 62U or 62L to flatten against a number of the horizontal longitudinal indexing grooves 52 as shown in FIG. 24. In effect, foam rubber gear teeth are formed and engaged with four or more longitudinal indexing grooves 52 across the full width of plant tray 50 thereby allowing for the generation of a considerable down loading force on plant tray 50 while maintaining gentle pressure over a large area of the plant tray surface. This embodiment also allows for the accommodation of a variety of plant trays having different numbers of plant cells because of the automatic adjustment of the layer of foam rubber 92 to the spacing of longitudinal indexing grooves 52.

Figure 25:
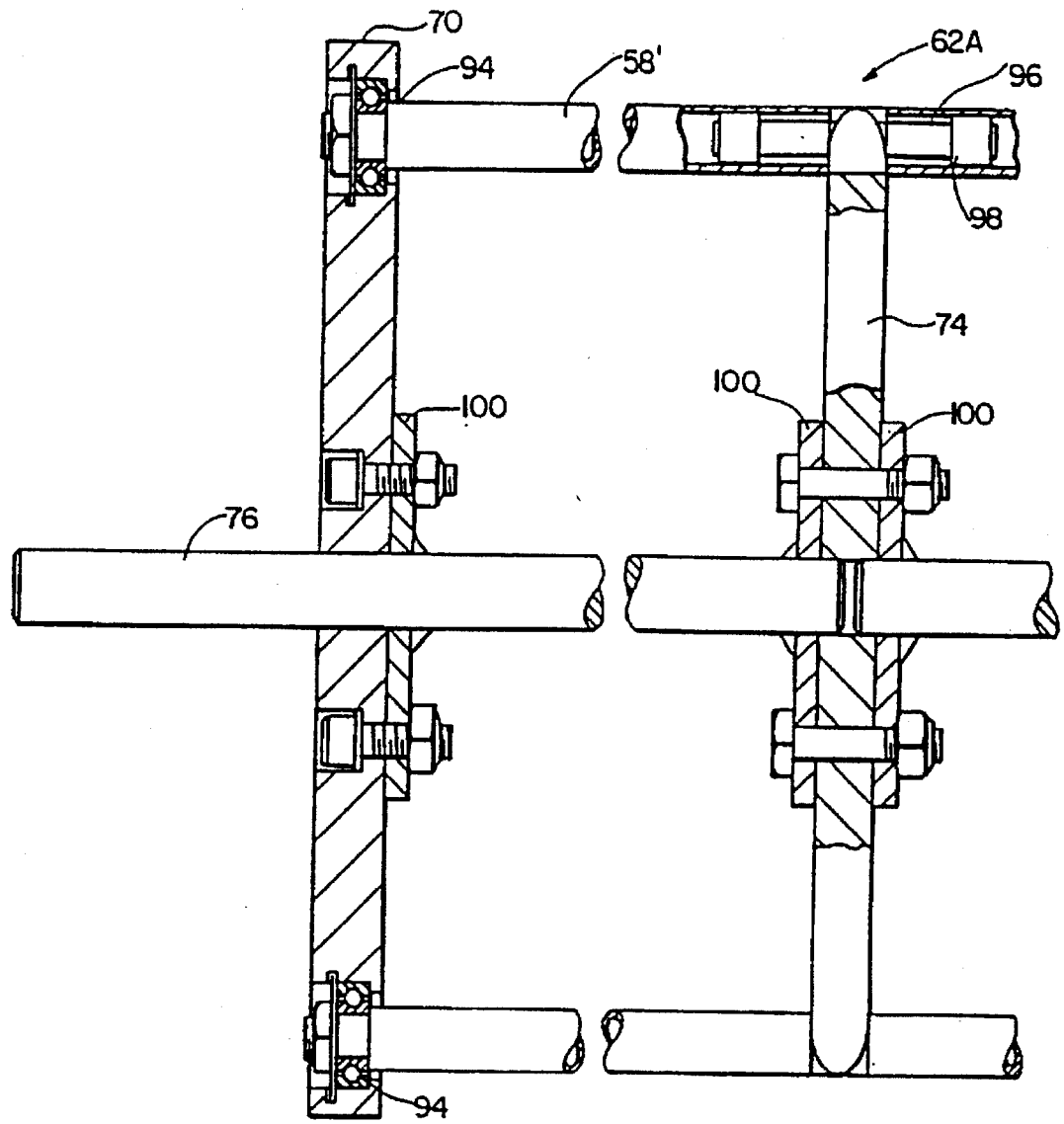
FIG. 25 is a front elevation view, partially in cross section, of a third embodiment of the down loader drum having rotatable down loader bars.
Figure 26:
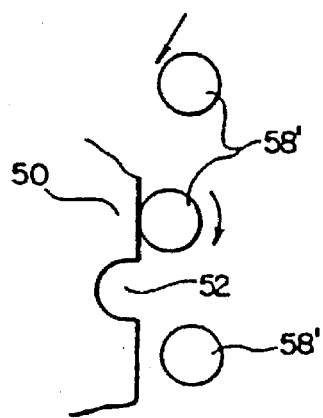
FIG. 26 is a side elevation view of the rotatable down loader bars approaching engagement with the indexing grooves on the lower surface of a plant tray.
Figure 27:
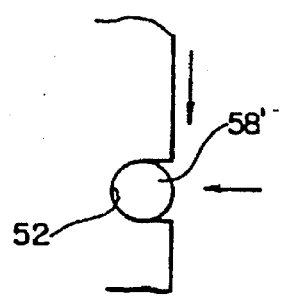
FIG. 27 is a side elevation view of a rotatable down loader bar engaged with an indexing groove on the back surface of a plant tray.

In another embodiment of the down loader drum, a drum 62A as shown in FIG. 25, has down loader rods 58' which are designed to be free to rotate along the lower surface of plant tray 50 until they roll into and engage with indexing grooves 52. Roller bearings 94 are provided in end plates 70 and 72, and needle roller bearings 96 are fitted inside down loader rods 58' at mid plate 74. Small stub axles 98 are secured to mid plate 74 to provide support for needle roller bearings 96 and down loader rods 58'. End plates 70 and 72 and mid plate 74 are secured by flanges 100 welded to the central down loader drum shaft 76. As a plant tray 50 is lowered into engagement with down loader drum 62A any misalignment between down loader rods 58' and longitudinal indexing grooves 52 is compensated for by pivotal movement of down loader drum support frame 64 away from loading frame 60 as rotatable down loader rods 58' roll along the bottom surface of plant tray 50 until they drop into an indexing groove 52 as shown in FIGS. 26 and 27. The rolling action of down loader rods 58' ensures that there will be no damage to plant tray 50 resulting from initial misalignment with down loader rods 58'.

In one embodiment of down loader drum 62, as shown in FIG. 23, a layer of foam rubber 92 can be provided around the spaced support down loader rods 58. The down loader rods 58 in this embodiment provide support for the application of pressure and rotational force to the layer of foam rubber. Rotational power can be provided to the down loader drum in this embodiment by a pneumatic powered gear drive assembly 95, rather than the pneumatic cylinder, spring and chain arrangement shown in FIG. 4. In this embodiment, a power output gear 91 driven by pneumatic powered gear drive assembly 95 engages with the ends of down loader rods 58 as shown in FIG. 5. The following description provides several additional embodiments for plug ejection mechanisms to be mounted to the indexing drum support frame 105 for movement relative to the indexing drum 110 and along a plane that intersects the central axis of the indexing drum. However, the invention is not intended to be limited to the specific combination of elements selected, and it is to be understood that the combination of components described for each of the embodiments can be varied to include all technical equivalents which operate in a similar manner to accomplish a similar purpose.

Figure 18:
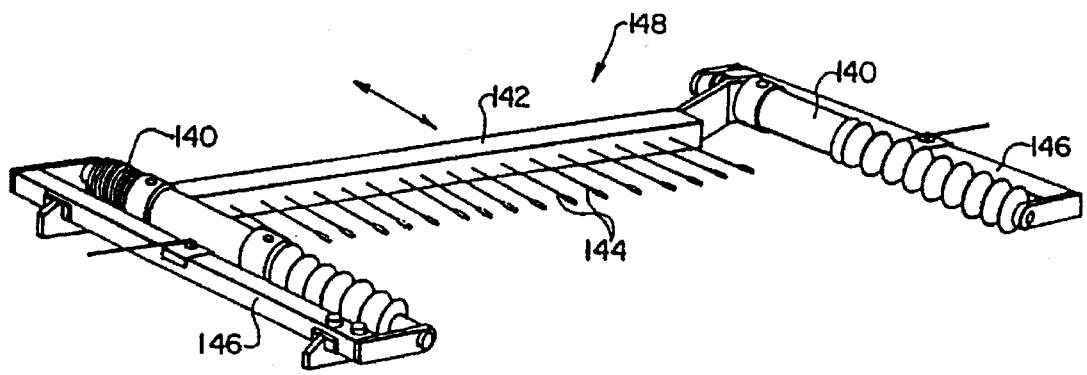
FIG. 18 is a perspective view of a second embodiment of the plug ejection mechanism.

One embodiment consists of two double rod air cylinders 140, as shown in FIG. 18, to which a pin mounting beam 142 is attached. A plurality of plug ejector pins 144 are mounted on pin mounting beam 142. Air cylinders 140 and pin mounting beam 142 are supported on a quick release plug ejector frame 146. Quick release plug ejector frame 146 is demountably fastened to indexing drum frame 105 by means such as bolting to vertical members 105a. This plug ejector sub assembly 148 can be quickly and efficiently changed in order to accommodate plant trays 50 having different numbers of plant cells 54.

When plug ejector sub assembly 148 is mounted on indexing drum frame 105 (FIG. 1A), pin mounting beam 142 (FIGS. 15 and 16) passes through the central cavity of indexing drum 110 and is parallel to the central axis of indexing drum 110. When air cylinders 140 are activated they force pin mounting beam 142 to travel along a plane intersecting the central axis of indexing drum 110 and cause plug ejector pins 144 to enter the drain holes in plant cells 54 contained in plant tray 50 as shown in FIGS. 15 and 16.

The plugs with seedlings are ejected onto a conveyer 150 having a plurality of plug retainers 152 as shown in FIGS. 21 and 22. Air cylinders 140 are then retracted and indexing drum 110 is rotated while activating pneumatic cylinder 124 in order to release pawl member 128 (as explained in greater detail above) until the next index position is reached.

Figure 19:
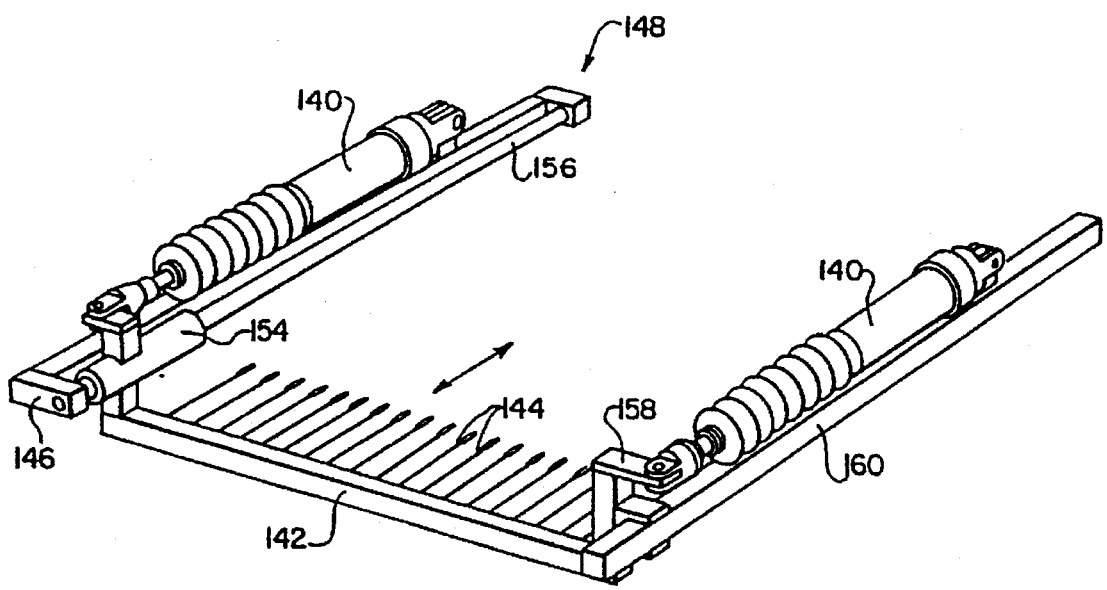
FIG. 19 is a perspective view of a third embodiment of the plug ejection mechanism.

In an alternative embodiment, as shown in FIG. 19, two air cylinders 140 are attached to a linear motion device consisting of a linear bearing 154 that is slidably mounted on a hardened steel shaft 156. Pin mounting beam 142 is mounted to linear bearing 154 at one end. At the opposite end pin mounting beam 142 is connected to a polyethylene or nylon yoke 158 which fits snugly but slidably around a bar 160 having a substantially square cross section. This mechanism ensures that pin mounting beam 142 moves linearly without rotation in a plane intersecting the central axis of indexing drum 110 and the row of plant cells 54 currently positioned for plug ejection.

In another alternative embodiment of the plug ejector mechanism, as shown in FIG. 20, a gear drive 162 is mounted on quick release plug ejector frame 146 to engage with two parallel gear racks 164 mounted at each end of pin mounting beam 142. Gear drive 162 is activated by an air motor 166 or alternative drive means. Gear drive 162 drives gear racks 164 in a forward direction towards loading frame 60 and plant tray 50 in order to eject plugs contained in plant tray 50. Subsequently, gear drive 162 drives gear racks 164 and pin mounting beam 142 backwards away from loading frame 60 in order to prepare for rotating indexing drum 110 to its next planting position. Torsional shaft 168 connecting the gears 161 at both ends of gear drive 162 transfers equal rotational force to both gear racks 164 and ensures that gear racks 164 remain parallel.

In describing the disclosed embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

What is claimed is:

1. A transplanter comprising:
   a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;
   a loading frame having a back side and a front side for slidably supporting said plant tray with said bottom surface of said tray facing said back side of said loading frame;
   a quick release indexing drum support frame mounted adjacent said back side of said loading frame;
   a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;
   means for intermittently rotating said indexing drum about its central axis and positively engaging said indexing drum in successive plug ejection positions;
   a plug ejection mechanism mounted to said indexing drum support frame for effecting the ejection of the plugs from said plant tray.

2. A transplanter comprising:
   a plant tray having a plurality of said drains for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;
   a loading frame having a back side and a front side for slidably supporting said plant tray with said bottom surface of said tray facing said back side of said loading frame;
   a quick release indexing drum support frame mounted adjacent said back side of said loading frame;
   a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;
   means for intermittently rotating said indexing drum about its central axis and positively engaging said indexing drum in successive plug ejection positions;

a plug ejection mechanism mounted to said indexing drum support frame for effecting the ejection of the plugs from said plant tray;
   a plant foliage separator comb assembly demountably connected to said front side of said loading frame, said plant foliage separator comb assembly including a plurality of plates arranged in vertical, parallel spaced relationship for passing between the plants in said plant tray as said plant tray is moved into engagement with said indexing drum; and
   a conveyor belt mounted for movement towards and away from said loading frame so as to provide means for catching the plugs and transporting the plugs to a planting position.

3. A transplanter comprising:
   a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;
   a loading frame having a back side and a front side for slidably supporting said plant tray with said bottom surface of said tray facing said back side of said loading frame;
   a quick release indexing drum support frame mounted adjacent said back side of said loading frame;
   a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;
   means for intermittently rotating said indexing drum about its central axis and positively engaging said indexing drum in successive plug ejection positions;
   a plug ejection mechanism mounted to said indexing drum support frame for effecting the ejection of the plugs from said plant tray;
   a plurality of down loader rods arranged in spaced, parallel relationship around the circumference of a circle to form a down loader drum having a central axis;
   a pivotal down loader drum support frame mounted adjacent said back side of said loading frame and rotatably and demountably supporting said down loader drum in a position vertically above said indexing drum for movement towards said back side of said loading frame to disengage said down loader rods from said indexing grooves;
   means for intermittently rotating said down loader drum so as to drive said plant tray downwardly towards said indexing drum when said down loader rods are engaged with said indexing grooves; and
   means for biasing said down loader support frame towards said loading frame.

4. A transplanter comprising:
   a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;
   a loading frame having a back side and a front side for slidably supporting said plant tray with said bottom surface of said tray facing said back side of said loading frame;
   a quick release indexing drum support frame mounted adjacent said back side of said loading frame;
   a plurality of indexing rods arranged in spaced, parallel relationship around the circumference of a circle to form an indexing drum having an interior cavity and a central axis, with said indexing drum being rotatably and dem indexing drum support frame and held in position relative to said loading frame to allow engagement of said indexing rods with said indexing grooves, wherein said indexing drum includes a circular end ring connected at each end of said indexing rods and a circular mid ring connected at the midpoint of said indexing rods and said end rings and mid ring being perpendicular to said indexing rods and concentric to said central axis of said indexing drum;
   means for intermittently rotating said indexing drum about its central axis and positively engaging said indexing drum in successive plug ejection positions; and
   a plug ejection mechanism mounted to said indexing drum support frame for effecting the ejection of the plugs from said plant tray:
   said plant tray having an alignment groove in the bottom surface, with said alignment groove being perpendicular to said indexing grooves and having a profile configured to mate with the outer circumference of said circular mid ring, thereby providing means for positioning said plant tray relative to said indexing drum and said plug ejection mechanism.

5. A transplanter comprising:
   a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;
   a loading frame having a back side and a front side for slidably supporting said plant tray with said bottom surface of said tray facing said back side of said loading frame;
   a quick release indexing drum support frame mounted adjacent said back side of said loading frame;
   a plurality of indexing rods arranged in spaced, parallel relationship around the circumference of a circle to form an indexing drum having an interior cavity and a central axis, with said indexing drum being rotatably and remountably connected to said quick release indexing drum support frame and held in position relative to said loading frame to allow engagement of said indexing rods with said indexing grooves;
   means for intermittently rotating said indexing drum about its central axis and positively engaging said indexing drum in successive plug ejection positions; and
   a plug ejection mechanism mounted to said indexing drum support frame for effecting the ejection of the plugs from said plant tray, wherein said plug ejection mechanism comprises:
   a plurality of plug ejecting pins;
   a pin mounting beam supporting said pins in a row with said pins each spaced apart by a distance substantially equal to the distance between said drain holes in said cells;

a pair of air powered cylinders mounted at each end of said pin mounting beam; and a quick-release frame supporting said air powered cylinders, said quick-release frame being demountably connected to said indexing drum support frame with said pin mounting beam being maintained in parallel relationship with said central axis of said indexing drum and passing through the interior cavity of said indexing drum so that activation of said air powered cylinders moves said pin mounting beam relative to said indexing drum and said pins pass between two adjacent of said indexing rods engaged with said indexing grooves on said plant tray to enter a row of said drain holes, thereby ejecting a row of plugs from said plant tray.

6. The transplanter of claim 5, wherein:

said plug ejecting pins include a base portion connected to said pin mounting beam, a waisted shank portion for allowing sideways deflection of said pin, and a bulbous head portion for contact with said plugs, and wherein said head portion supports an axially extending tapered spike for entering a plug and maintaining contact between said head portion and said plug until said plug has been fully ejected from said plant tray.

7. A transplanter comprising:

a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;

a loading frame having a back side and a front side for slidably supporting said plant tray with said bottom surface of said tray facing said back side of said loading frame;

a quick release indexing drum support frame mounted adjacent said back side of said loading frame;

a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;

means for intermittently rotating said indexing drum about its central axis and positively engaging said indexing drum in successive plug ejection positions:

a plug ejection mechanism mounted to said indexing drum support frame for effecting the ejection of the plugs from said plant tray, wherein said plug ejection mechanism comprises:

a plurality of plug ejecting pins;

a pin mounting beam supporting said pins in a row with said pins each spaced apart by a distance substantially equal to the distance between said drain holes in said cells;

a linear bearing connected to one end of said pin mounting beam;

a shaft slidably supporting said linear bearing;

a yoke connected to the other end of said pin mounting beam;

a bar slidably and nonrotatably supporting said yoke;

a quick release frame supporting said shaft and said bar in spaced, parallel relationship with said pin mounting beam extending between and connected to said shaft and said bar; and means for moving said linear bearing and said yoke along said shaft and said bar, respectively; and said quick release frame being demountably connected to said indexing drum support frame with said pin mounting beam being maintained in parallel relationship with said central axis of said indexing drum and passing through the interior cavity of said indexing drum so that activation of said moving means moves said pin mounting beam relative to said indexing drum and said pins pass between two adjacent of said indexing rods engaged with said indexing grooves on said plant tray to enter a row of said drain holes, thereby ejecting a row of plugs from said plant tray.

8. The transplanter of claim 7, wherein:

said plug ejecting pins include a base portion connected to said pin mounting beam, a waisted shank portion for allowing sideways deflection of said pin, and a bulbous head portion for contact with said plugs, and wherein said head portion supports an axially extending tapered spike for entering a plug and maintaining contact between said head portion and said plug until said plug has been fully ejected from said plant tray.

9. A transplanter comprising;

a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;

a loading frame having a back side and a front side for slidably supporting said plant tray with said bottom surface of said tray facing said back side of said loading frame;

a quick release indexing drum support frame mounted adjacent said back side of said loading frame;

a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;

means for intermittently rotating said indexing drum about its central axis and positively engaging said indexing drum in successive plug ejection positions;

a plug ejection mechanism mounted to said indexing drum support frame for effecting the ejection of the plugs from said plant tray, wherein said plug ejection mechanism comprises:

a plurality of plug ejecting pins;

a pin mounting beam supporting said pins in a row with said pins each spaced apart by a distance substantially equal to the distance between said drain holes in said cells;

two parallel gear racks, each connected to opposite ends of said pin mounting beam;

two spaced gears engaged with respective ones of said gear racks;

a torsion bar connecting said gears;

means for driving said gears; and a quick release frame supporting said gear racks with said pin mounting beam maintained in parallel relationship with said central axis of said indexing drum and passing through the interior cavity of said indexing drum so that activation of said driving means moves said pin mounting beam relative to said indexing drum and said pins pass between two adjacent of said indexing rods engaged with said indexing grooves on said plant tray to enter a row of said drain holes, thereby ejecting a row of plugs from said plant tray.

10. The transplanter of claim 9, wherein:

said plug ejecting pins include a base portion connected to said pin mounting beam, a waisted shank portion for allowing sideways deflection of said pin, and a bulbous head portion for contact with said plugs, and wherein said head portion supports an axially extending tapered spike for entering a plug and maintaining contact between said head portion and said plug until said plug has been fully ejected from said plant tray.

11. A transplanter comprising:

a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;

a loading frame having a back side and it front side for slidably supporting said plant tray with said bottom surface of said tray facing said back side of said loading frame;

a quick release indexing drum support frame mounted adjacent said back side of said loading frame;

a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;

means for intermittently rotating said indexing drum about its central axis and positively engaging said indexing drum in successive plug ejection positions; and a plug ejection mechanism mounted to said indexing drum support frame for effecting the ejection of the plugs from said plant tray, wherein said plug ejection mechanism comprises:

a plurality of plug ejecting pins;

a pin mounting beam supporting said pins in a row with said pins each spaced apart by a distance substantially equal to the distance between said drain holes in said cells;

a pair of double rod pneumatic cylinders mounted on said indexing drum support frame;

a pair of racks mounted on said indexing drum support frame; and a pair of pinion gears engaged with said racks and connected to said pneumatic cylinders and opposite ends of said pin mounting beam for movement along said racks and perpendicular to said central axis of said indexing drum.

12. The transplanter of claim 11, wherein:

said plug ejecting pins include a base portion connected to said pin mounting beam, a waisted shank portion for allowing sideways deflection of said pin, and a bulbous head portion for contact with said plugs, and wherein said head portion supports an axially extending tapered spike for entering a plug and maintaining contact between said head portion and said plug until said plug has been fully ejected from said plant tray.

13. A transplanter comprising:

a plant tray having a plurality of cells for containing plugs of growing medium with plants extending therefrom, said cells each having a drain hole and said cells arranged in a plurality of longitudinal rows, and said tray having a bottom surface having a plurality of longitudinally extending indexing grooves thereon separating said rows;

a loading frame having a back side and a front side for slidably supporting said plant tray with said bottom surface of said tray facing said back side of said loading frame;

a quick release indexing drum support frame mounted adjacent said back side of said loading frame;

a plurality of indexing rods arranged in spaced, parallel relationship around the circumference of a circle to form an indexing drum having an interior cavity and a central axis, with said indexing drum being rotatably and demountably connected to said quick release indexing drum support frame and held in position relative to said loading frame to allow engagement of said indexing rods with said indexing grooves;

means for intermittently rotating said indexing drum about its central axis and positively engaging said indexing drum in successive plug ejection positions, wherein said intermittent rotating and positively engaging means comprises:

power drive means for engaging with said indexing rods and imparting rotation to said indexing drum;

sensor means for controlling activation of said power drive means based on the location of said indexing rods and the location of said plant tray; and an indexing lock means mounted on said indexing drum support frame for engaging said indexing rods to stop said rotation at predetermined intervals; and a plug ejection mechanism mounted to said indexing drum support frame for effecting the ejection of the plugs from said plant tray.

14. The transplanter of claim 13 wherein said indexing lock means includes:

a pawl member having a plurality of lock lobes, a plurality of cam lobes, a pivot point, and an attachment point;

a pneumatic cylinder connected to said attachment point for oscillating said pawl member about said pivot point;

said cam lobes disposed in between said lock lobes and in contact with said indexing rods so that said rotation of said indexing drum contributes to the oscillation of said pawl member generated by said pneumatic cylinder until said lock lobes stop said rotation.

15. The transplanter of claim 13 wherein said power drive means comprises:

a drive pawl;

a pneumatic cylinder connected at one end to said drive pawl for driving said drive pawl in a direction parallel to the central axis of said pneumatic cylinder;

said pneumatic cylinder pivotally connected at an end opposite from said drive pawl to said indexing drum support frame; and a means for biasing said drive pawl into engagement with said indexing rods.

16. A transplanter for driving plant trays having drive member receiving means into successive positions for ejection of plant seedlings contained within said plant trays and ejecting said seedlings, said transplanter comprising:

a loading frame for supporting said plant trays with said seedlings oriented in a horizontal direction;

a plurality of plant tray drive members;

means for mounting said plant tray drive members for movement relative to said loading frame;

means for driving said plant tray drive members into engagement with said drive member receiving means for moving said plant tray in a vertically downward direction;

means for ejecting said seedlings from said plant tray with said means for ejecting being mounted on said means for mounting said plant tray drive members and with said means for ejecting being mounted for reciprocal movement relative to said plant tray drive members; and means for clamping a plant tray in a fixed position relative to said loading frame while another plant tray is being moved in a vertically downward direction by said plant tray drive members.

* * * * *